United States Patent [19]
Larsson et al.

[11] Patent Number: 5,572,727
[45] Date of Patent: Nov. 5, 1996

[54] SOFTWARE STRUCTURE FOR TELECOMMUNICATION SWITCHING SYSTEMS

[75] Inventors: G. Hakan Larsson; Kerstin M. Odling; K. Ake Rosberg, all of Tyreso; J. Hakan Karlsson, Stockholm, all of Sweden

[73] Assignee: Telefonaktiebolaget L M Ericsson, Stockholm, Sweden

[21] Appl. No.: 383,817

[22] Filed: Feb. 6, 1995

Related U.S. Application Data

[62] Division of Ser. No. 289,997, Aug. 12, 1994, Pat. No. 5,388,258, which is a continuation of Ser. No. 800,537, Nov. 27, 1991, abandoned.

[51] Int. Cl.[6] .................................................. G06F 17/30
[52] U.S. Cl. ................................... 395/616; 364/DIG. 1; 364/284; 364/286
[58] Field of Search .................................................. 395/600

[56] References Cited

U.S. PATENT DOCUMENTS

| | | | |
|---|---|---|---|
| 4,724,521 | 2/1988 | Carron et al. | 395/700 |
| 4,768,150 | 8/1988 | Chang et al. | 395/700 |
| 4,864,502 | 9/1989 | Kucera et al. | 364/419.08 |
| 4,962,497 | 10/1990 | Ferenc et al. | 370/60.1 |
| 4,974,191 | 11/1990 | Amirghodsi et al. | 395/275 |
| 5,067,104 | 11/1991 | Krishnakumar et al. | 395/375 |
| 5,086,426 | 2/1992 | Tsyjajisgu et ak | 370/85.13 |
| 5,233,513 | 8/1993 | Doyle | 354/401 |
| 5,247,651 | 9/1993 | Clarisse | 395/500 |
| 5,247,693 | 9/1993 | Bristol | 395/800 |
| 5,249,274 | 9/1993 | Sztipanovits et al. | 395/375 |
| 5,291,479 | 3/1994 | Vaziri et al. | 370/58.2 |
| 5,327,529 | 7/1994 | Fults et al. | 395/155 |
| 5,388,258 | 2/1995 | Larsson et al. | 394/600 |

OTHER PUBLICATIONS

Smith, "Next Generation Software Techniques", IEEE Global Telecommunications Conference and Exhibition, 28 Nov.–1 Dec., pp. 726–729 vol. 2 Dec. 1, 1988.

Bruno et al, "Software Tools and Suport Environment of the National Centre for Supervision and Management of the Italian Telephone Network", Seventh International Conference on Software Engineering for Telecommunication Switching Systems, 3–6 Jul. 1988, p Jul. 6, 1989.

Kara et al, "An Architecture for Integrated Network Management", IEEE Global Telecommunications Conference and Exhibition, pp. 191–195 vol. 1, 27–30 Nov. 1989. Nov. 30, 1989.

Armstrong et al, "ERLANG User's Guide & Reference Manual and ERLANG BIF Guide", Ellemtel Utvechings AB May 7, 1991.

1990 International Conference on Computer Languages, *KSL/Logic: Integration of Logic with Object*, Mamdouh H. Ibrahim and Fred A. Cummins, Electronic Data Systems, Auburn Hills, MI, pp. 228–235 (conference given in New Orleans, Louisiana, 12–15 Mar. 1990.

(List continued on next page.)

*Primary Examiner*—Wayne Amsbury
*Attorney, Agent, or Firm*—Jenkens & Gilchrist

[57] ABSTRACT

The disclosed system includes a declarative language construct for use in programming telecommunications switching systems, comprised of certain natural language elements such as subjects, predicates and objects. The disclosed system also includes an efficient method for constructing prototype telecommunications system software that provides the capability to handle the real-time and parallel nature of operations in telecommunications systems. In yet another aspect, the disclosed system provides a layered software architecture for use in connection with telecommunications switching systems that enhances overall system functionality.

24 Claims, 9 Drawing Sheets

OTHER PUBLICATIONS

OOPSLA '87: Conference on Object Orientated Programming, Systems, Languages and Applications, *OTM: Applying Objects to Tasks,* John Hogg, Steven Weiser, Computer Systems Research Institute, University of Toronto, Toronto, Ontario, pp. 388–393 (conference given in Orlando, Florida, 4–8 October 1987).

Experiments with Programming Languages and Techniques for Telecommunications Applications; B. Dacker et al.; Sixth International Confernece on Software Engineering for Telecommunication Switching Systems (1986); pp. 128–135.

Using Prolog for Rapid Prototyping of Telecommunication Systems; J. L. Armstrong and M. C. Williams; Seventh International Conference on Software Engineering for Telecommunication Switching Systems (1989); pp. 183–187.

Erlang: An Experimental Telephony Programming Language; Proceedings, XIII International Switching Symposium, vol. III, p. 48 (1990).

Erlang Users Guide and Reference Manual; J. L. Armstrong, S. R. Virdling, and M. C. Williams (1991).

Erlang Bif Guide; J. L. Armstrong, S. R. Virdling and M. C. Williams (1991).

Kordon et al. *Rapid ADA Prototyping; Principles and Example of a Complex Application,* Mar. 21, 1990, 9th International Phoenix Conference on Computers and Communications, pp. 453–460.

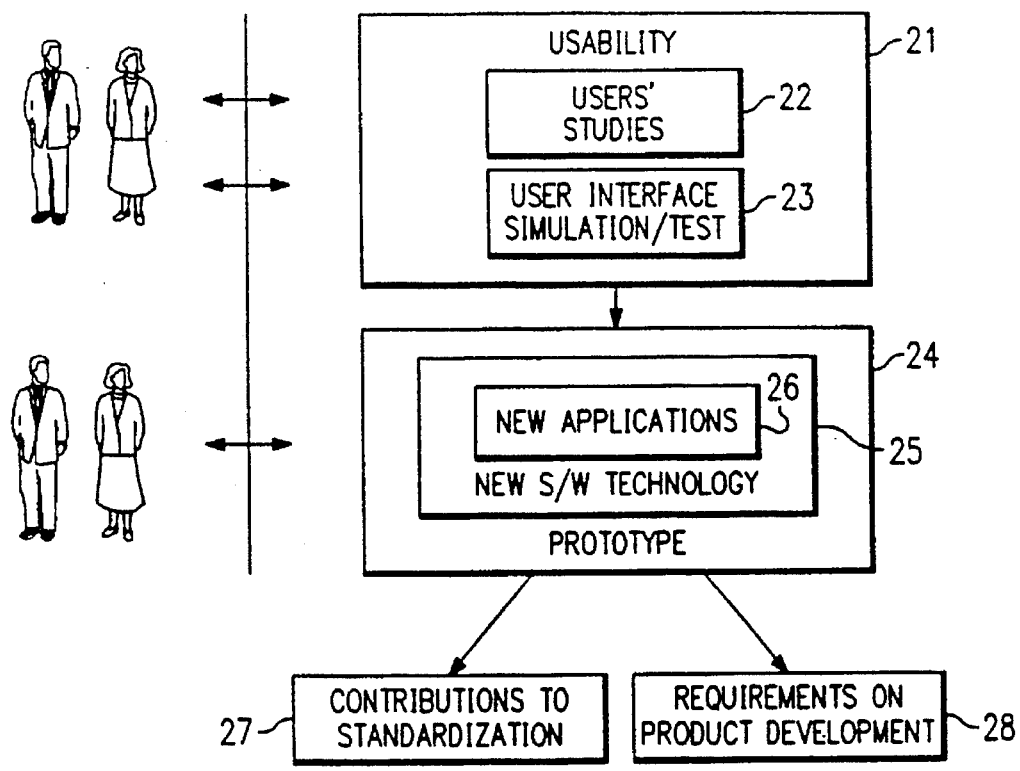
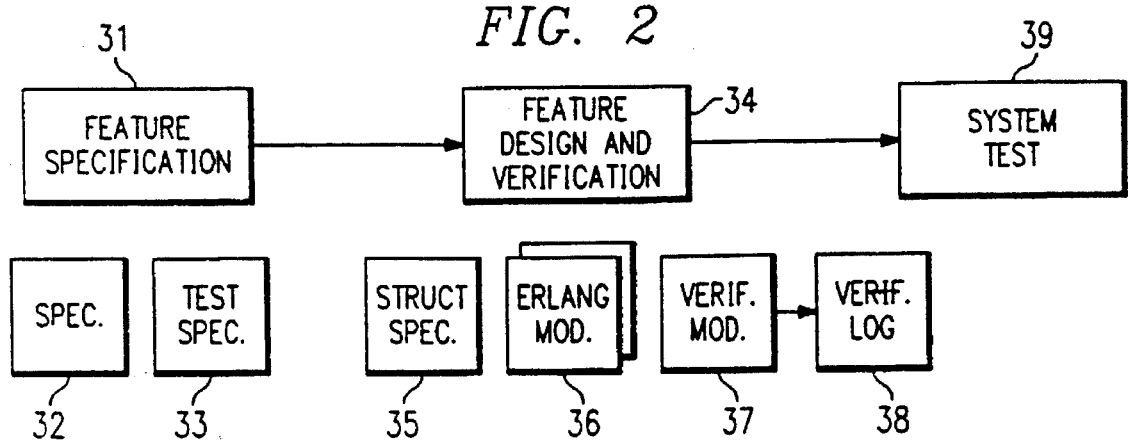

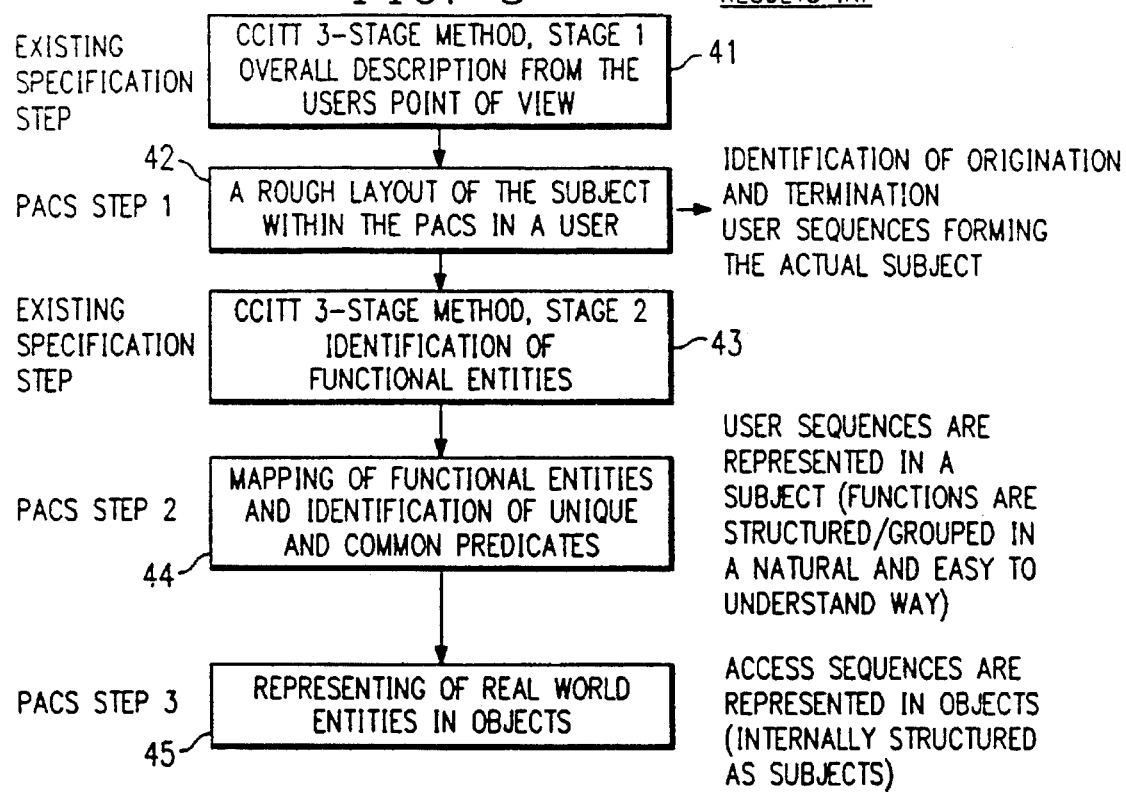
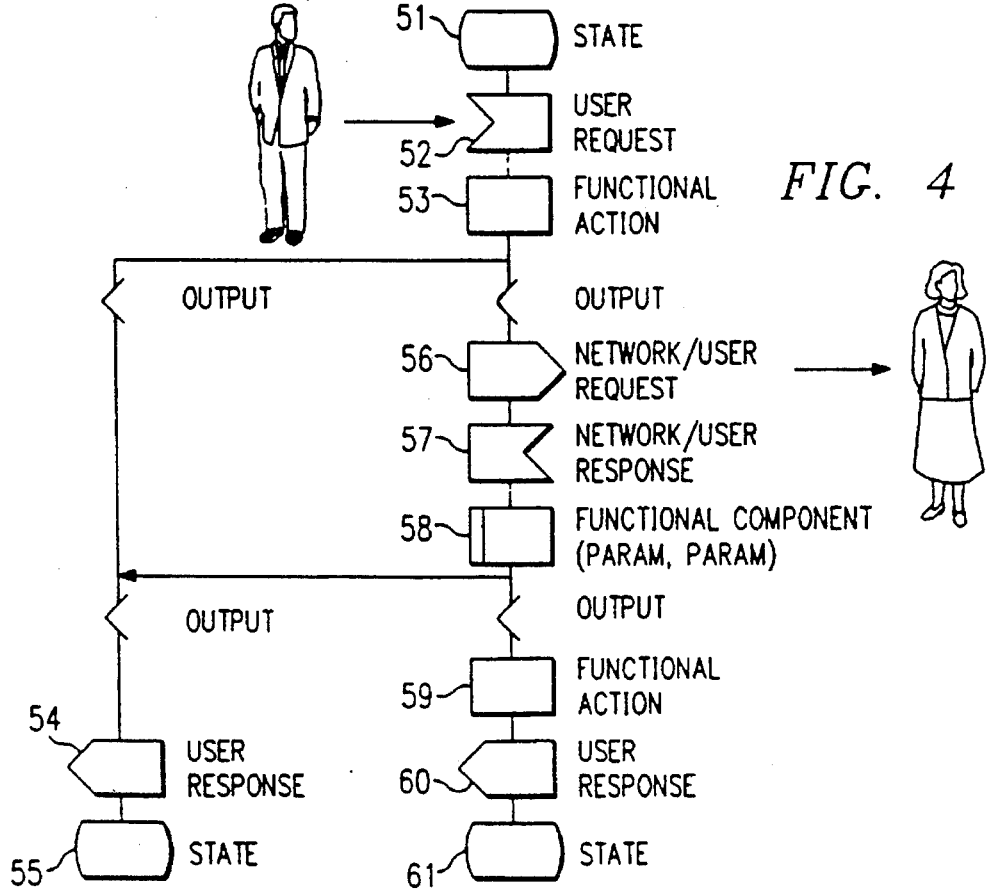

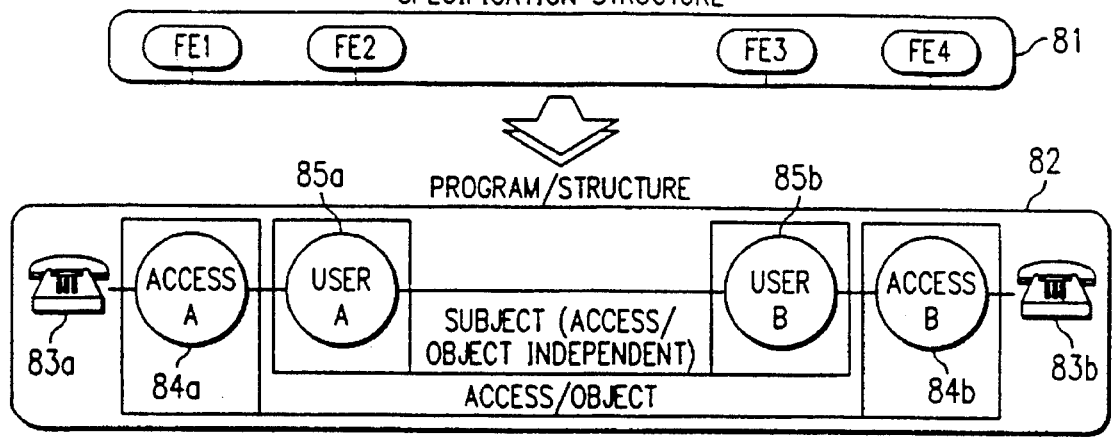
FIG. 6
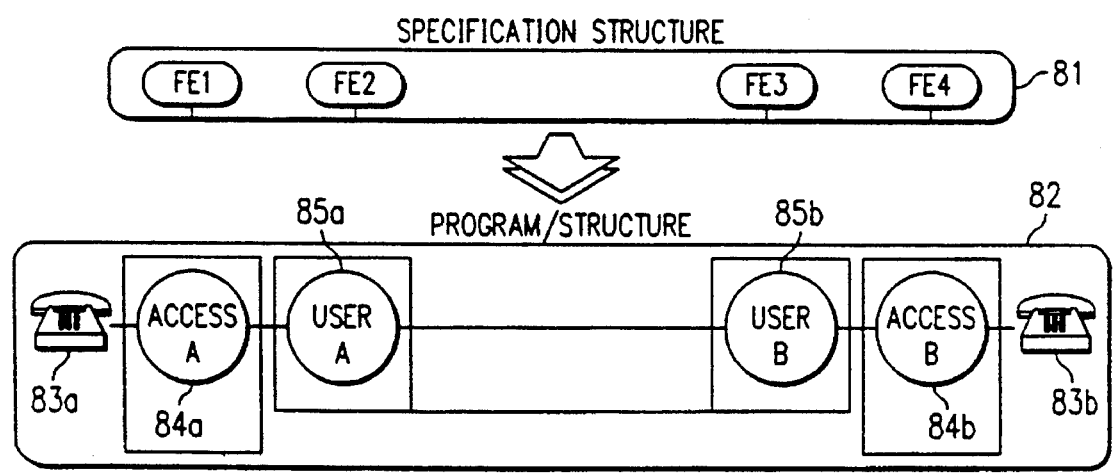
FIG. 7
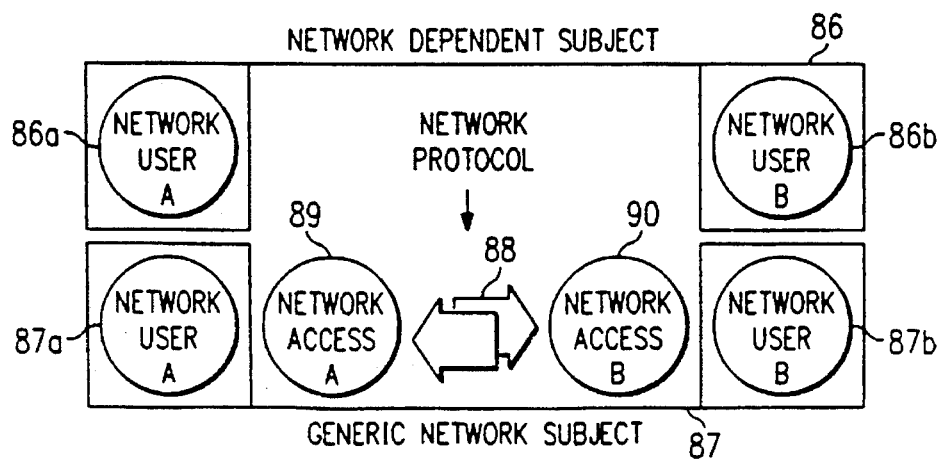

SOFTWARE STRUCTURE FOR TELECOMMUNICATION SWITCHING SYSTEMS

This is a division of application Ser. No. 08/289,997, now U.S. Pat. No. 5,388,258, filed Aug. 12, 1994; which is a continuation of application Ser. No. 07/800,537, filed Nov. 27, 1991, now abandoned.

BACKGROUND OF THE INVENTION

A portion of the disclosure of this patent document contains material which is subject to copyright protection. The copyright owner has no objection to the facsimile reproduction by any one of the patent documents or the patent disclosure, as it appears in the patent and trademark office, patent file or records, but otherwise reserves all copyrights whatsoever.

1. Field of the Invention

The invention relates to telecommunications switching systems and, more particularly, the development and structure of process control software for telecommunications switching systems.

2. Description of Related Art

The development of software architectural structures and application programs for stored program controlled telecommunications switching systems has historically been a complex and time-consuming task. The process requires many steps ranging from the development of functional specifications defining the operation and interaction of the services to be provided to the testing of the actual real-time code in the hardware within which the system is to run. Development of such software architectures has also required the interaction of a number of different developers each working in different aspects of the development and requiring the coordination of multiple activities at each step along the way in the development process. Thus, bringing to market new software systems for implementing user demand driven functions and features has been very expensive and such an arduous and time-consuming process that by the time systems are designed, developed, tested and commercially implemented in the marketplace, the user demand has often changed to still newer requirements.

One of the principal considerations in the development of any software system is a selection of the method of programming to be employed in constructing the system. Well known prior art methods of programming include: process-oriented programming with languages such as "ADA" or "PASCAL"; object-oriented programming with languages such as "C++" or "SMALLTALK"; and declarative programming with languages such as "PROLOG" or "LISP". None of these languages contains the full set of features desirable for developing telecommunications switch software. For example, the process-oriented programming language concept provides a good understanding and a good definition of the subject to be programmed, but, it gives very limited support for structuring and defining actions or predicates within the process. When programming the actions within a process, the designer is required to supply a great number of individual details within the application software. Similarly, while the PASCAL/ADA generation of programming languages gives some support to defining and handling of data, the programmer is still required to do a great deal of work on a detail level which has very little to do with the actual application being produced.

Even the latest object-oriented programming methods have their limitations. Such object-oriented methods of programming have concentrated on various techniques to define and inherit objects and on how to document objects. Although these techniques make a significant contribution in the case of developing programs that contain a large number of objects to be defined and handled, many problems related to clarity and structure occur when a program is itself defined as an object.

In process control programs such as those for telecommunications systems, however, the program entity is always the subject which acts and directs the activities within the system. The objects in a telecommunications process program system are basically of two types:

(1) All such program systems have internal objects defined in terms of data upon which the programs operate. These objects are the software systems' reality and the data is the static picture of the real world which the programs manipulate.

(2) All real time and process control systems, however, also operate on dynamic objects outside the program systems. Examples of such dynamic objects are images on a display screen or telephones and trunks in a telecommunication system. These program systems will also include the dynamic objects as being represented by data objects.

The object-oriented programming technique of encapsulating actions together with data and defining all of it as an object is a distinct advantage if the program is a routine which is closely related to its objects. Examples of such routines are found in display screen presentation systems as well as in the line interface parts of a telecommunications system. If, however, the control programs in such a process control software system are all defined as objects, certain negative effects are also produced. First, the control programs become fragmented and very complex interactions and relationships become necessary between the objects. Such a result requires an overlay control structure and in known object-based telecommunication systems, complex C.C.I.T.T. specification design language (SDL) flow charts have been required to describe such control structures. Moreover, the dynamic relationships between the objects are still very difficult to describe and to understand even with the use of such flow charts. Second, when no entities in the control software system are defined as a subject, any explanatory model becomes inherently defective. The program actions, that is, its predicates, become bundled together with the objects, thus rendering both the objects and the actions very difficult to locate. This makes almost impossible the organization of actions within process control systems into logical groups. Further, designers are unable to structure applications in a natural way that would be both highly understandable to anyone viewing the organization and easy for designers to work with.

The latest generation of declarative programming languages such as PROLOG and LISP are very efficient and reduce the work of software design and programming because: (a) all programming can be done in symbolic form; and (b) the concept of predicates and a whole new set of powerful instructions have been included within those languages. The use of such languages dramatically reduces both the number of details a programmer needs to be concerned with and the importance of program encapsulation. The real disadvantage of utilizing declarative languages in process control and real time systems such as stored programmed control telecommunications switching systems, is their insufficient real time performance and their inability to handle parallelism.

Many of the newer declarative or object oriented programming languages have been used to allow programmers to perform rapid prototyping of functions or programs. Rapid prototyping techniques have a number of recognized advantages that flow from the ability to incrementally design and develop an application or a system. Potentially costly design errors can be detected and corrected earlier in the development process; individual aspects of a system can be implemented and tested very quickly; lengthy test and/or implementation phases can be avoided; and fast prototype development allows designers to explore a number of options with respect to an application or function. Many other advantages to prototyping exist as well.

Rapid prototyping techniques have benefits in the context of telecommunications systems as well. Until now, however, the techniques have had several drawbacks due to the real-time nature of the processing activities that occur in telecommunications systems and the parallel nature of these operations. The system of the present invention includes certain aspects that extend previously known prototyping methods and capabilities so that rapid prototyping can effectively be used in connection with telecommunications systems. Experiments in the use of prototyping techniques in connection with telecommunications systems are described in "Using Prolog for Rapid Prototyping of Telecommunication Systems," J. L. Armstrong and M. C. Williams, Seventh International Conference on Software Engineering for Telecommunication Switching Systems, Jul. 3–6, 1989, Bournemouth, and in "Experiments with Programming Languages and Techniques for Telecommunications Applications," B. Dacker, N. Elshiewg, P. Hedeland, C. W. Welin, M. Williams, Sixth Int'l Conference on Software Engineering for Telecommunication Switching Systems, Apr. 14–18, 1986, Eindhoven, which are hereby incorporated herein by reference.

The development of the declarative language ERLANG has essentially solved these two problems allowing the introduction of process control concept into the world of declarative languages. The basic concepts of the ERLANG language are described in the article "ERLANG: An Experimental Telephony Programming Language," Proceedings, XIII International Switching Symposium, Vol. III, pp. 48 (1990), which is hereby incorporated herein by reference. A more detailed treatment is found in the "Erlang User's Guide & Reference Manual" and the "Erlang BIF Guide" which are incorporated herein as Attachment A. The use of such a language enables the construction of real time process control software systems in accordance with the system of the present invention.

SUMMARY OF THE INVENTION

In one aspect, the system of the present invention includes a declarative language construct for use in programming process control systems such as telecommunications switching systems. The language construct includes natural language elements comprising a subject, represented by the process of actions, a predicate, represented by predicates of the declarative language defined as program procedures, and an object, represented by data and real world entities defined in symbolic form and included in object processes.

In another aspect, the system of the present invention includes a method for constructing prototype software for telecommunications switching systems including the procedures for preparing functional specifications and subsequently mapping those functional specifications directly onto the users and the network functional entities employing the declarative language construct of the present invention.

In still another aspect, the present invention includes a software architecture for use within a process control system such as a telecommunications switching system. In this aspect, the system includes a layered architecture comprising an application layer, an application operating system layer, and a basic operating system layer each cooperating with one another to provide an enhanced level of functionality.

In a further aspect, the invention includes a method for constructing a prototype software system for a telecommunications switching system in which the overall description of the service aspects of the software system is first defined from the user's point of view. The origination and termination of user sequences forming the actual subjects within a user is identified. Next, the functional entities and information flows within the system are identified and the functional entities and identifications of unique and common predicates are mapped. Finally, the real world entities are represented as objects within the system.

In yet another aspect, the invention includes a multi-layer software architecture for use within a telecommunications switching system which includes an application layer for implementing telecommunications features within the switching system and which is constructed with a direct correspondence to the telecommunications application being specified. An application operating system layer is provided for support functions to the application layer and for hiding and isolating the implementation details of the telecommunications application. A basic operating system layer includes the primitives and functions needed for implementation of telecommunications functions as well as standard primitives and run-time executives for a time sharing computer system. One embodiment of this aspect includes an application layer having task modules for defining particular tasks within a telecommunications function or application being implemented, including the signaling protocols to be employed therein. In some cases, if the implementation of a feature requires no specialized management functions to be directly associated with it, a task may comprise only one or more feature modules. Similarly, there may be instances in which a task may only comprise one or more management modules, with no feature modules included. Finally, a task module may comprise both one or more feature modules along with one or more management modules.

In yet still another aspect, the invention includes a system for managing data within the architecture of a telecommunications switching system which includes at least one feature module and at least one management module within an application layer and a data base within a basic operation system layer. Feature-unique data fields are created within the data base and assigned formats, limits and default values by means of an initiation part of the feature module. An initiation portion of the management module creates commands and parameters referring to the data fields within the data base and stores the commands and parameters in the data base. Each command is analyzed in response to its reception and is checked for the authority of its use and whether its parameters are within preselected value limits. The appropriate individuals are accessed by a management feature in response to the acceptance of the command and the appropriate feature unique data field is operated upon to modify the field in response to the command.

As will readily be appreciated by those of ordinary skill in this particular art, the principles and aspects of this invention could be used to advantage in other software systems and in a variety of other computer and process control applications in addition to telecommunications switching systems.

BRIEF DESCRIPTION OF THE DRAWINGS

For an understanding of the present invention and for further objects and advantages thereof, reference may now be had to the following description, taken in conjunction with the accompanying drawings, in which:

FIG. 1 is a block diagram illustrating the application of the system of an embodiment of the present invention to the development of prototype software for the control of telecommunications switching machines;

FIG. 2 is a block diagram of the steps employed in the development of prototype software;

FIG. 3 is a flow chart illustrating software development in accordance with an embodiment of the system of the present invention;

FIG. 4 is a flow chart illustrating the steps of specifying the service aspects of telecommunications software development in accordance with an embodiment of the invention;

FIG. 6 is a block diagram illustrating the mapping of functional entities from a functional specification onto the software system structure in accordance with an embodiment of the present invention;

FIG. 7 is a block diagram illustrating the mapping of functional entities in the case of a network from the specification to the software system in accordance with an embodiment of the present invention;

DETAILED DESCRIPTION OF THE PRESENTLY PREFERRED EXEMPLARY EMBODIMENT

Figure 5:
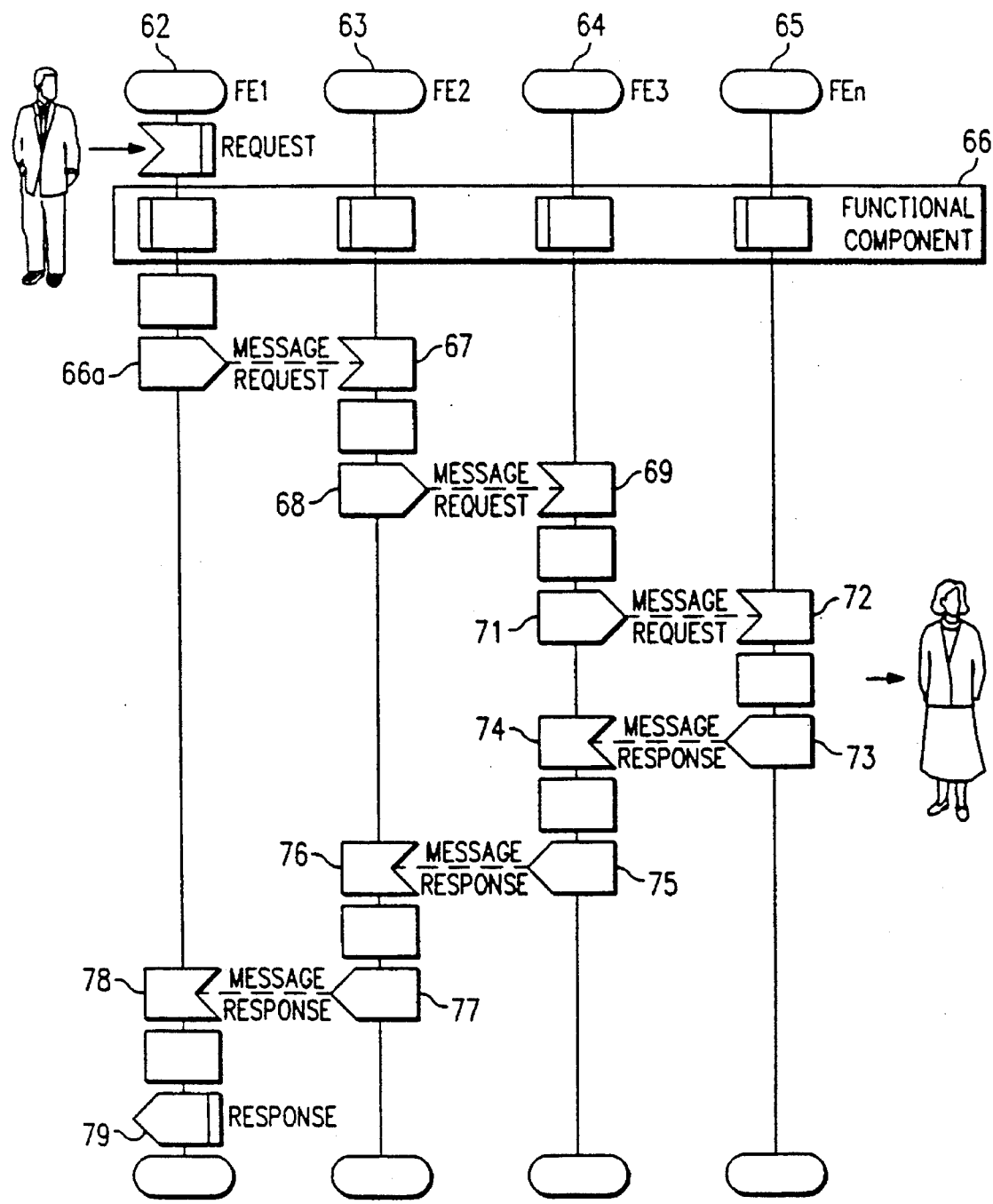
FIG. 5 is a flow chart illustrating the specification of the functional network aspects of the development of telecommunications software in accordance with an embodiment of the invention.

The preferred exemplary system of the present invention consists of several different related aspects including a programming language structure especially adapted for use in software of real time process control systems such as telecommunications systems; a methodology used for the preparation of prototype software used in telecommunications switches; and a software architecture and program construction tool for telecommunications switching systems. Each of these different aspects of the present invention and their interrelationships with one another will be discussed below both with regard to their theoretical and technological underpinnings as well as their use in a practical, operating software system.

Software Construction Methodology

As discussed above, each of the well known programming methods of process-oriented programming, object-oriented programming, and declarative language programming includes certain inherent disadvantages when applied to real time process control environments such as that present in telecommunications switching systems. The programming construction methods for such real time processes used in the system of the present invention incorporate capabilities to handle real time processing and performance as well as parallelism of operations, by employing a robust declarative language with a novel language construction technique to produce clear and easy to understand application-oriented software architectures.

The language construction technique of the system of the exemplary embodiment is characterized by the usage of the three natural language elements of subject, predicate, and object. The subject is represented by the process of actions, while the predicate is represented by predicates of the declarative language defined as program procedures. The object is represented by data and real world entities such as telecommunications trunks and telephones, all of which are defined in symbolic form and included in an object process. The present technique not only makes it possible for a software designer to concentrate on defining the different entities in the application structure being constructed, but it strongly encourages it. Usage of the three basic elements of human language allows a model to be created that is not only powerful but also clear and easy to understand. Moreover, the present language construction may also be viewed as a paradigm of active subjects ("PACS").

In the present exemplary system, a subject is defined as a sequence or a number of sequences of predicates and is characterized by the actions that it is able to perform. This provides a powerful mechanism for structuring all functions into groups in order to form natural and easy to understand entities within the software. The use of the process concept solves a great number of real time problems, and, in addition, it supports the introduction of the language element of "subject" into the construction of computer programming languages. In the present system, a subject process is named and specified as to its content of action in a manner similar to the way in which individuals such as masons, mechanics or carpenters are named and defined in the real world. This enables the natural specification of relations between actions. For example, in a PBX software system, this aspect is known as service interaction, which in the employment of the present methodology, becomes a natural part of the subject specification. A thorough knowledge of the actual application is required, however, in order to define the proper subjects for an application or service. The subject concept also supports the effort to move the focus of software development from low-level implementation details toward overall applications and solutions to user-defined problems.

Subjects can be defined, in the present exemplary system, at any, except the lowest, level of abstraction within the designer's conceptualization of the system or application being developed. At the highest level of abstraction, there is a subject that defines and breaks down the entire functionality of the system. The highest level subject that provides the overall control sequence and flow for the system is akin to a main program or routine utilized in traditional programming languages. In this aspect of the system of the present invention, subjects comprise a sequence of subject, predicate and object processes or a sequence of only predicate and object processes to define the full set of activities that form a part of that subject.

Examples of functions or activities that might be defined as subjects within the present system include, but are not limited to: (a) activation of a telecommunications switching system; and (b) interrogation of a telecommunications system as to what services are available within the system. It should be understood that a subject which is defined as a sequence or a number of sequences of predicates could be interpreted as activities, or control flows, within the user part of the feature module that handles a particular aspect of a feature, as described below in the sections related to the "Improved Prototyping Technology" and "Software Architecture and Technology" aspects of the present invention. What follows immediately is a sample set of "pseudo-code" that could be used within the system of the present invention to define a subject.

```
<Subject Definition>
    <Export/Import Predicate Declarations>
    <Description of the Interface>
    <Initiation Part>
        <Initiation of default data, user procedures, test procedures,
        used user suffixes and timers, e.g.>
    <User sequences, PACS step 1 > ACTIVATION, DEACTIVATION
    and REGISTRATION>
        activate(FromUser,UserState,UsersParticipated,UserData)–>
        <activate predicate 1>
        <common predicate x>
        .
        .
        <activate predicate N>
        <deactivate(FromUser,UserState,UsersParticipated, UserData) –>
        <common predicate y>
        <deactive predicate x>
        .
        .
        <common predicate N>
        register(FromUser,UserState,UsersParticipated,UserData) –>
        <register predicate 1>
        <common predicate z>
        .
        .
        <register predicate N>
    <User sequences, PACS step 1 > INTERROGATION
        interrogate(FromUser,UserState,UsersParticipated,UserData) –>
        <interrogate predicate 1>
        <common predicate z>
        .
        .
        <interrogate predicate N>
    <User sequences, PACS step 1 > INVOCATION
        userInvocation(UserState,InteractingState,UsersParticipated,
        UserData) –>
        <continue in user 1 operation>
        interactingInvocation1(UserState,InteractingState,
        UsersParticipated,UserData) –>
        <continue in user 2 operation>
        interactingInvocation2(UserState,InteractingState,
        UsersParticipated,UserData) –>
        <continue in user 3 operation>
    <User sequences, PACS step 1> OPERATION
        <USER 1, PACS step 2>
        user1(UserState,InteractingState,UsersParticipated,UserData)–>
        <user 1 predicate 1>
        <common predicate x>
        .
        .
        <user 1 predicate N>
        <USER 2, PACS step 2>
        user2(UserState,InteractingState,UsersParticipated,UserData)–>
        <user 1 predicate 1>
        <common predicate x>
        .
        .
        <user 1 predicate N>
        <USER 3, PACS step 2>
        user2(UserSTate,InteractingState,UsersParticipated,UserData)–>
        <user 1 predicate 1>
        <common predicate x>
        .
        .
        <user 1 predicate N>
    <User sequences, PACS step 1 > EXCEPTIONS
        activationException(UserState,InteractingState,
        UsersParticipated,UserData) –>
        <activationException predicate 1>
        <common predicate x>
        .
        .
        <activationException predicate N>
        deactivationException(UserState,InteractingState,
        UsersParticipated,UserData) –>
        <deactivationException predicate 1>
        <common predicate y>
        .
        .
        <deactivationException predicate N>
```

© 1991 Telefonaktiebolaget L M Ericsson

The predicates used by the subjects are defined in the exemplary system of the present invention by either basic instructions or by the formation of new predicates by defining program routines referred to as procedures. Each procedure can be specialized and unique for one particular subject or it may be generalized and used by many different subjects. Each procedure is also characterized by its action. The use of procedures in a layered architecture as predicates in the declarative language introduces a virtually unlimited possibility for raising the abstraction level and increasing the power of the top level language. One basic rule that should be employed in designing this type of system should be to keep the number of procedures small enough so as to keep the system easy to understand and maintain. A predicate should be viewed as a discrete procedure such as, for example, number analysis. Although the predicate could perform a complex task, it must always be very clear. At the lowest level, a predicate could consist of nothing more than a single declarative language statement. It should also be understood that the predicates used in the language construction aspect of the invention are represented as predicates in a declarative language and defined as program procedures within the application operating system (AOS) as described below in the section related to the "Software Architecture and Technology" aspect of the invention.

The present exemplary method can be compared to the known C++ manner of providing for the inheritance of all or part of a program. In that case, however, both the real objects and the predicates are called objects and the actions or predicates are always closely linked to the real objects. This is done in C++ in order to provide encapsulation. However, the need for encapsulation is not nearly as important when using the declarative languages as when using the object-oriented languages. The weak linkage of actions to objects, as in C++, is highly counterproductive to the production of an easy to understand functional structure. The present method, on the other hand, makes it possible to inherit only predicates or actions which support creation of a clear functional structure. Such functional structures are then easy to understand and this is always of great importance in the construction of process control software systems.

An object, in the present exemplary system, is defined as a process containing data and/or real world entities in symbolic form bundled together with closely related actions. This makes it possible to include in the object process, any actions which are closely tied to the object and not of vital importance to the logical structure of predicates. Such routines include, for example, routines for scanning the status of external objects, calculating routines always performed for a certain object, and routines for displaying something on a screen. Thus, the principal advantage of object-oriented methods such as C++ are utilized in the present system. It is, however, of great importance that subjects and objects are not intermixed with one another because they are both implemented as processes. The process is an implementation technology and subjects, predicates and objects are all process entities within the application architecture. If a routine is not tightly coupled to the data object, it should be separated out as a predicate process. Methods employed to inherit and to include other objects may be introduced as needed, as is well known in this technology. By the same token, if a predicate is large or complex, then it should be structured as a subject instead.

It should also be understood that the aspect represented by data and real world entities in the language construction aspect of the invention can be interpreted as the access part as described below in conjunction with the section on the "Software Architecture and Technology" aspect of the invention. In that connection the user part executes a predicate, or a procedure, which is an order to the access part to perform a specific task. This order is not dependent on how the actual real world entity is designed. That is, the order could be to inform the access about actual conditions of the call, e.g., an incoming call, the number of the calling party, e.g., 12345, and the category of the incoming party, e.g., an operator. If the access is an analogue extension then probably it would only be possible to generate a ringing signal within that access aspect. However, if the access aspect is a feature phone and has a display then the number 12345 could be shown on the display along with the possible indication of the operator category.

The software structure methodology of the present exemplary invention strongly supports the movement of software designers and programmers away from implementation details and toward an increased knowledge about and focus on the application itself. It makes possible the creation of clear and easy to understand application-oriented software architectures even when the applications involve very complex processes and logic. The technique of the present exemplary invention makes the software easy to maintain and to enhance by adding functions, as will be further exemplified below in connection with the description of other aspects of the present exemplary embodiment.

An Improved Prototyping Technology for the Development of Software for Use in Telecommunications Switching Systems The preferred exemplary system of the present exemplary invention can be used to develop and evaluate state of the art software architectures or telecommunications switching systems, and in particular, for the production of a useful prototyping base for the development of new applications or extensions for such software. The programming paradigm used in the present system is that of declarative programming, as set forth above, and the operating system employed is especially adapted for the support of telecommunications applications. For example, the operating system has been extended to include per-call fault recovery.

The development of telecommunications switching software is becoming more and more market driven. With increasing frequency, application experts are becoming involved in software architecture designs in order to simplify the handling of sales features throughout the entire development chain. That is, features in the product specifications are mapped onto actual feature modules within the software architecture. This, in fact, introduces a market driven approach into software development.

Prototyping communications switching systems architecture and switching systems software involves the solving of very complex problems and necessitates the verification of the results of practical experiments at an early stage. Prototyping is divided into cycles, each having its own defined objectives wherein one cycle contains a limited number of features which are fully implemented and each successive cycle introduces new features. Such prototypes represent realistic systems even though they are limited in their functionality. Prototypes can have real time characteristics and software qualities that are comparable to real products. They form a stable base for the building of further prototypes as well as for the implementation of operational software.

The prototyping process is a very important phase in the preparation of an overall work model and allows designers to make the user the primary focus. Referring to FIG. 1, there is shown a block diagram illustrating the process in which the usability 21 of the proposed system is evaluated from study of the users' and their requirements 22, followed by a user interface simulation/test 23 providing the initial working premises of the prototype. Next, the prototyping process itself 24 is implemented. This process utilizes the new software technology 25 for prototyping new applications 26 in order to achieve thoroughly reviewed requirements specifications for product development 28, as well as to produce qualified inputs to standards organizations 27. A further benefit achieved is that, with relatively little effort, these prototypes can be developed into a final, operational product.

In practice, prototypes of new applications or features are designed, implemented and then tested at a cooperative user site. The actual work model for constructing the prototype is shown in FIG. 2 and the ultimate model is characterized by the housing of each feature in a feature module. FIG. 2 illustrates the corresponding documents that must be produced during the specification and design phases, which includes a feature specification 31 which comprises both a functional specification 32 and a test specification 33. From the feature specification 31, a feature design and verification phase 34 is entered which includes the preparation of a structural specification 35, a plurality of declarative language modules 36, and a verification module 37 which is used to produce a verification log 38. Finally, a system test Phase 39 is undertaken and completed.

Referring next to FIG. 3, there is shown a flow chart illustrating the overall view of the multiple stages in the development of a prototype software in accordance with the present system. As pointed out above, the starting task in producing a prototype is to prepare the specification. At 41 there is employed the first stage of the three-stage methodology prescribed by the C.C.I.T.T. standard procedures. More particularly, these techniques are shown in C.C.I.T.T. specifications I.130 (Method for Characterization of Telecommunications Services); Q.65 (Detailed Description of Stage 2); and I.310 (ISDN Network Functional Principles), each of which is hereby incorporated herein by reference. This initial stage provides for the preparation of an overall description or specification of the application from the user's point of view. Next, at 42, there is prepared a rough layout of the various subjects to be incorporated within the declarative language construction set forth above for each user. This involves the identification of both origination and termination user sequences forming the actual subjects. Thereafter, at 43, the system employs another specification step, Stage 2 of the three-stage methodology set forth in the above-identified C.C.I.T.T. procedures, including the identification of functional entities. Next, at 44, functional entities are mapped and unique and common predicates are identified in accordance with the declarative language approach set forth above. In this step, user sequences are represented in a subject(s) and the various functions are structured and/or grouped in a natural and easy to understand way. Finally, at 45, each of the real world entities are represented as objects. For example, access sequences are represented using objects, although they may be internally structured as subjects.

By way of further explanation of the prototyping technique of the present exemplary embodiment, FIG. 4 illustrates the Stage 1 specification of the service aspect of the functional specification. This is the procedure within which the overall description is prepared from the user's point of view. As shown in FIG. 4, the service may already exist in a particular state 51 and, in response to a user request 52, it may require a functional action 53. The result of such a functional action at 53 may produce an output triggering a user response at 54 and a selection of a particular state 55. However, the functional action at 53 may also take the form of a network/user request 56 invoking a network/user response 57 that results in a functional component 58. The output of the component 58 may produce further functional actions 59, along with a user response 60 taking the system to an internal state 61.

Similarly, the Stage 2 procedure of generating the functional specification deals with the functional network aspects such as the identification of functional entities and the information flows within the system. As can be seen in FIG. 5, a plurality of functional entities (FE$_1$–FE$_n$) 62–65 are interconnected with the functional component aspect of the network 66. Each of these functional components are capable of exchanging messages with other functional components so that there is a complete information flow within the various components of the system to link the entities into a functional network. For example, a message request sent at 66a from the functional entity 62 is received at 67 of functional entity 63. In response, it forwards a message request from 68 to 69 at functional entity 64 which in turn forwards a message from 71 to receptor 72 in functional entity 65. Thereafter, a response generated in functional entity 65 is passed by means of message responses from 73–74 and from 75–76 and 77–78 through the functional entities 64 and 63 to the functional entity 62 which provides a response at 79 to the original request.

Referring next to FIG. 6, there is shown an illustrative diagram of the manner in which the functional entities in the case of local, i.e., non-networked, telecommunications are mapped onto the program structure. There, it is shown how the functional entities FE$_1$–FE$_4$ comprising the specifications structure 81 are mapped onto the program structure in accordance with the present exemplary embodiment 82. As can be seen, two telephone instruments 83a and 83b, are interconnected, respectively, to the software structure by means of access 84a and access 84b. Each of the accesses perform as objects within the software structure. Similarly, the accesses 84a and 84b are interconnected by means of a user A entity 85a and a user B entity 85b, which form subjects within the program structure of the present invention and are, as can be seen from FIG. 6, access/object independent.

Referring next to FIG. 7, there is shown a similar illustrative diagram illustrating the way in which functional entities are mapped in the case of networked telecommunications. There is illustrated the manner in which the functional entities FE$_1$–FE$_4$ of the specification structure 81 are mapped onto the program structure 82. Again, the telephone instruments 83a and 83b are connected, respectively, to access A and access B 84a and 84b, respectively. Similarly, a user A entity 85a and a user B entity 85b again form separate subjects within the program structure that are access/object independent. In addition, there is a further network dependent subject 86 along with a generic network subject 87. Each of these contain a network user A 86a, 87a and a network user B 86b, 87b. In addition, a network protocol 88 interconnects a network access A entity 89 and a network access B entity 90.

In the prototyping system of the present invention, the process concept is used to model the run time structure call model of the application with processes executing concurrently with one another. A process becomes active due to an external stimuli/signal and after execution of the actual code, a process remains in a certain defined state. Such a model matches very well the characteristics of the application in that there are many parallel calls and each call triggers several sequences of operations.

Figure 12:
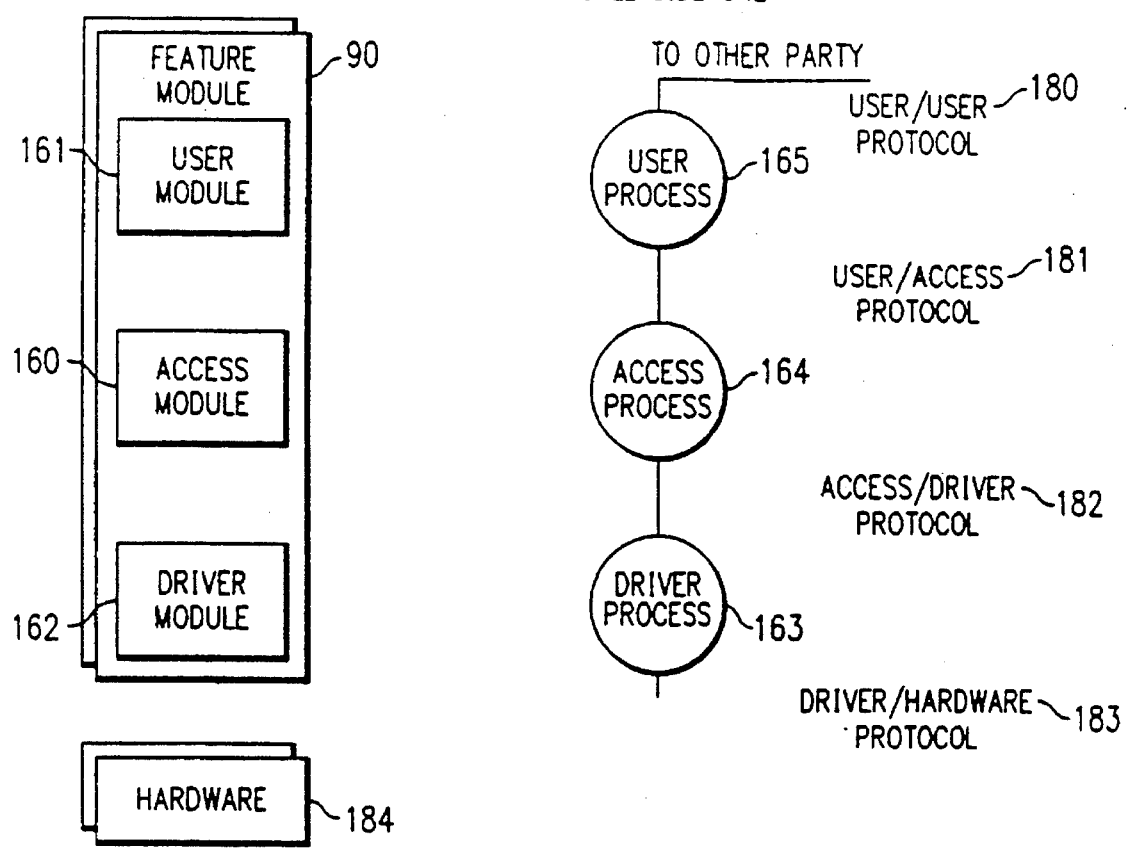
FIG. 12 is a block diagram illustrating the call side separation aspect of an embodiment of the present system.

In general, the system divides the call model in the same way that the functional model in the specification is divided. Referring next to FIG. 12, the functional feature modules 90 each have different entities for accesses 160 and for users 161, and, in addition to these modules, the line/terminal devices 162 are also separately modeled. Thus, as illustrated in FIG. 12, for each side of a call, separate processes are assigned for: (a) each hardware device (driver process 163); (b) each type of line (access process 164); and (c) each party in a call (user process 165).

Networking features, as well as stand-alone PBX features, should be well matched and, since they are already placed in the functional model in the specification work phases, separate call sides are represented by different entities. Therefore, a split view is chosen for call control resulting in two call sides, each having its own set of processes. Split call control also includes the additional advantage that the total number of states is significantly reduced. Split call control requires, in many cases, negotiations/communication between the call sides before decisions are made. Thus, the communication between the sides is supported by a high level protocol hiding the message as it passes between processors.

As will be discussed in greater detail below, the system software architecture is divided into several layers. This offers distinct advantages such as the fact that:

(1) the application becomes independent of the selected operating systems;

(2) the application becomes independent of the selected CPU hardware as well as of the telecommunications hardware; and (3) the distribution of processors is hidden from the application.

Figure 8:
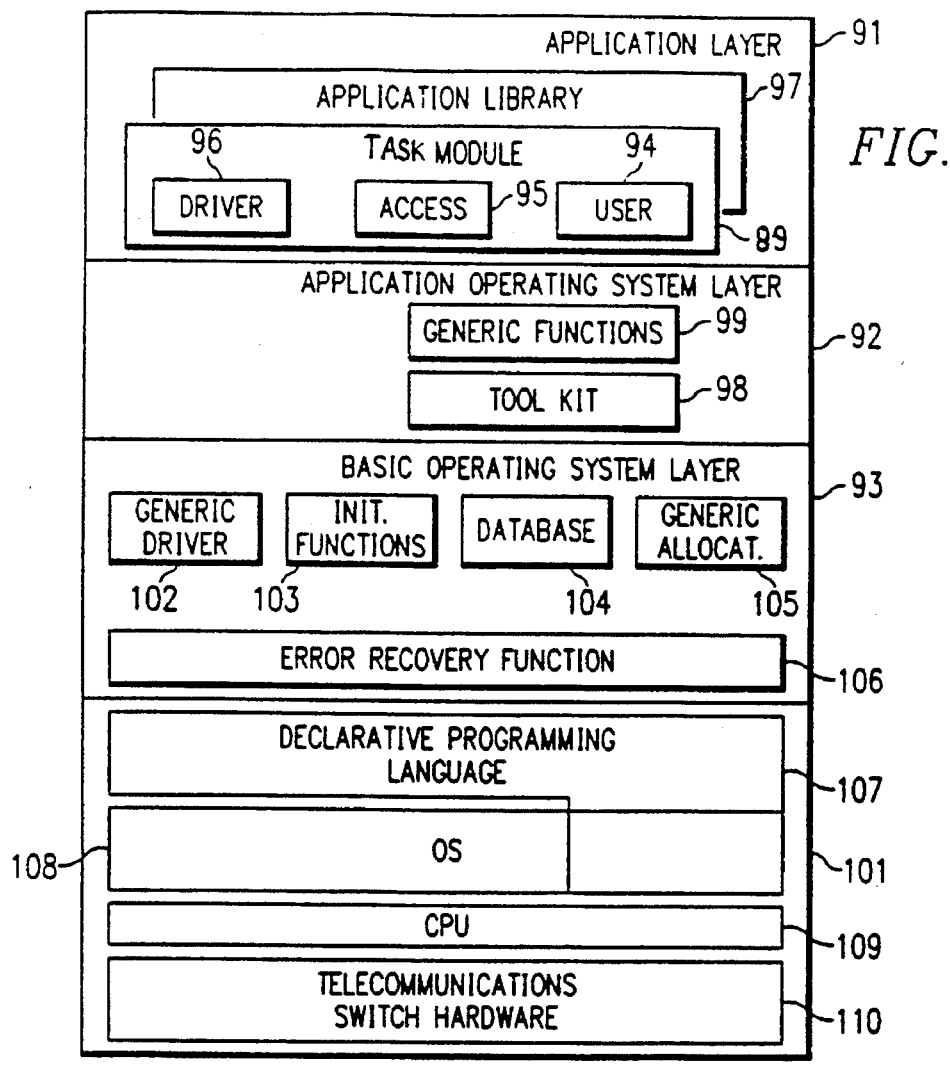
FIG. 8 is a block diagram illustrating the overall architecture of software for a telecommunications switching system constructed in accordance with an embodiment of the present invention.

The layered structure of the system architecture is shown in FIG. 8 in which an application layer 91, an application operating system layer 92, and a basic operating system layer 93 comprise the software system. The application layer code is delimited in order that the application software structure may model, as closely as possible, the operational run time environment. The application layer 91 includes a number of independent task modules 89 which reflect the sales objects/features previously defined in the specification work phase. These task modules 89 are further subdivided into user modules 94, access modules 95 and driver modules 96. Each user module 94 handles the access independent aspects of a feature, i.e., the traffic control portion of a feature. Each access module 95 handles terminal characteristics and origination/termination of individual call sessions. Each driver module 96 handles encoding of logical signals to bitstreams to the hardware and the decoding of bitstreams and logical signals from the hardware. These task modules 89 describe the complete set of functions or features for either (a) the telephone tasks, including signaling protocols; (b) the management tasks; or (c) the interaction between features. One mandatory feature of the present system is the basic call sequence.

The application layer 91 of the system also contains an application library 97. The application library 97 of components provides a powerful tool for designers and developers that raises the level of application design. It contains functions which are frequently used when designing features. Each of these functions may be identified in the specification phase for each new application and incorporated into the system without the need to actually program the details required to make the functionality operational.

Continuing to refer to FIG. 8, the application library 97 incorporates, for example, functions that are frequently used when designing features. Functions may be identified in the specification phase and then also simply reused within the work phase. The functions of the application library 97 may well involve functionality on several call sides in contrast to the constraints in that regard on the application operating system functions. The following is a list of functions that might be included within the application library 97:

(a) Answer call;

(b) Check call;

(c) Connect call;

(d) Disconnect call;

(e) Distribute calls;

(f) Join call;

(g) Merge call;

(h) Queue call;

(i) Relink;

(j) Reroute call (k) Resume call;

(l) Revert call;

(m) Seize parties;

(n) Setup call;

(o) Split call; and (p) Suspend call.

In addition, application library 97 functions may also be defined for management type features.

The application operation system (AOS) layer 92 of the system architecture, also shown in FIG. 8, provides support functions to the application layer 91 and helps developers avoid duplicating code in several different features. It also assists in allowing application programming to occur at as high a level of abstraction as possible by again hiding implementation details from the application designer. The AOS layer 92 has two primary function groups, a tool kit 98 and a set of generic functions 99. The tool kit 98 provides general purpose functions to the application layer 91 that includes, for example, the following functions: (a) interparty communication; (b) switching; (c) queuing; (d) timing; (e) call history; (f) number analysis; and (g) configuration management. The generic functions 98 within the AOS layer 92 provide the mechanisms necessary to execute the user 94 and access 95 modules contained within the feature modules 90.

The operating systems of telecommunications systems are usually simple run-time executives with little more functionality than the capability to send messages between parts of the system, load code, perform I/O operations, etc. This often means, in telecommunications systems, that it is more difficult to manage distribution, restarts, or other operational/procedural mechanisms than it is to code the functionality of a particular feature or application. The approach of the operating system of the present invention, as illustrated in FIG. 8, is to instead provide a basic operating system 93 that is more akin to those available on standard time-sharing systems but which also contains the additional primitives and functions needed especially for telecommunications. Some examples of such functions include:

(a) generic functions for drivers 102;

(b) initialization functions 103;

(c) database storage and retrieval functions 104;

(d) device allocation 105 and de-allocation functions;

(e) error recovery functions 106;

(f) switch handling based upon the switch group abstraction; and (g) hiding the reality of a distributed architecture and actual configurations.

Standard primitives for message passing between processes, process scheduling, I/O connections to hardware, etc. are of course also present, along with a control program panel. The basic operating system ("BOS") 93 of the present invention raises the level of programming but also contributes to making the system fault-tolerant. The BOS 93 maintains information about which resources have been allocated to application processes and also about which processes are linked together in a transaction. Thus, when a fault occurs, either because of a programming error or because a cooperating node fails, the BOS 93 is capable of terminating the connected processes and restoring the resources. One effect of this is that it allows per-call error recovery. Another advantage is that it provides a very robust test environment for development of new applications software. Further, in the present exemplary system, therefore, hardware and software faults only affect the transactions in which they occur and the system can be reorganized and reordered in an efficient and orderly manner.

As discussed above, programming of both prototype and real time operating systems in accordance with the present exemplary invention employs a declarative language such as, for example, the language ERLANG constructed in accordance with the paradigm of active subjects discussed above. In choosing ERLANG for this purpose, the languages LISP, PROLOG, and PARLOG were investigated. The investigation indicated the need for additional constructs to handle parallelism, real time operations, and other characteristics particular to telecommunications switching systems. Even the special class of logic languages capable of handling parallelism, such as PARLOG, concurrent PARLOG and others, still do not include sufficient granularity of concurrency that an asynchronous telephone process can be represented by a single process in the language. ERLANG possesses the desirable features of both PROLOG and PARLOG but with concurrency and error recovery constructs built into the language itself. As will be apparent from a review of the above-incorporated references on ERLANG, ERLANG includes the characteristics of high-level symbolism, a pattern matching syntax, simple control structures, high-level data structures, support for error detection and correction, light weight processes, and message passing.

In the implementation of the prototyping system of the present invention, the prototyping environment may comprise standard work stations running under the UNIX operating system. The development environment in the workstations may include a user interface including X-Windows, archives with menu-based access, version management, text editors running under UNIX, document preparation through frame maker, and communication via electronic mail. In addition, the prototyping support system includes tools for the specification phase as well as for future design and verification phases. Tools which are common for these work phases include browsers, selected views, hypertext editors, traceability within a document, between documents in the same work phase, and traceability between the specification and the ultimate code.

For the specification work phase, the support system provides graphic tools, tools for static and dynamic modeling, and templates. For the design and verification work phases, the most important tool is the ERLANG system which supports the following capabilities:

(a) executing a feature module and simulation of hardware nodes;

(b) tracing steps of individual functions;

(c) spying on all communications to a particular process;

(d) examining process structures, i.e., determining which processes are suspended, how processes are linked for error recovery purposes, etc;

(e) examining the process global variables; and (f) recompiling code on the fly and introducing it into the operational run time system.

The support system, in addition, provides interactive graphics, data base and other tools.

Various features may be chosen as test objects in the evaluation of the prototyping technology. Such features are designed according to the functional specifications for a modern PBX, such as the Ericsson MD 110 and include the following features: basic call, basic network call, basic cordless call, calling line identification, three-party services, call forwarding, operator extending, call completion on busy/no reply, operator recall, and intrusion.

As set forth above, the layering approach in the software architecture, together with the close mapping of the functional structure in the specifications, make it possible to have a single individual perform the entire feature design and implementation. This individual may also be responsible for the function specification work phase thus making it possible for software designers to become real application designers with their focus on the customers and their requirements. This further allows the lower layers in the architecture to be taken care of by system designers, more particularly suited to the task.

The close mapping of the software architecture to the functional structure makes the work model very simple. As a consequence, the number of documents produced by the present system is greatly reduced. Further, some documents in the prototype can be automatically generated. Moreover, a measurement of design efficiency compared to present systems indicates at least an increase in efficiency of up to 10 times, The reduction in the number of persons involved in the design and verification of a specific feature of prototype software is reduced to one individual, which offers numerous advantages, including the disappearance of long waiting periods and the reduction of lead times. A further benefit is more accurate software planning.

The design of task, feature or management modules in the present system is relatively easy and yet intellectually stimulating because of a number of different factors. For example, the verbal text of the functional specification corresponds to the code in the feature module, thereby improving code and feature understanding. In addition, programs are small in size and surveyable using language qualities like matching, list handling and recursive functions. Further, a design is incremental and interactive and the process allows for structured growth. Patching is not needed in the present system because programs can be recompiled on the fly and because repeated verification of features or of parts thereof is automatic and accomplished merely by test file activation. Finally, data can be displayed at a highly symbolic level; it is not necessary to consider capacity problems during design; and there is far less documentation to prepare.

As can be seen from the above description of the prototyping technique of the present invention, the architectural work is based upon genuine knowledge about the user application. This makes it possible to create a limited number of well defined entities within a layered structure. The system delimits the entities and strictly defines their functional content rather than requiring the development of additional methods for how to document and inherit the objects. The combination of that architecture, which is relatively easy to understand and handle, with a real time declarative language construct as set forth above, greatly reduces the amount of work needed to implement new services and features in a telecommunications switching system. It also makes possible the performance of real life testing of new services and features by implementing advanced prototypes before they are introduced in large scale into the market. The technique of the present invention makes it possible to move the volume of work away from implementation problems and it allows concentration on customer needs and on the development of new and more advanced services.

Software Architecture and Technology

As discussed above in connection with FIG. 8, the software system architecture of the present invention is layered and includes an application layer 91, an application operating system layer 92, and a basic operating system layer 93. In addition, an implementation layer 101 receives the layered software architecture. The application layer 91 includes an application library 97 having a number of task modules 89. Each task module 89 includes a user module 94, an access module 95 and a driver module 96. The application operating system layer 92 includes a tool kit 98 and a set of generic functions 99. The basic operating system layer 93 includes generic functions for drivers 102, system startup and restart functions 103, data base storage and retrieval functions 104, generic functions for device allocation/deallocation 105, and error recovery functions 106. The implementation in block 101 includes a declarative programming language system 107, such as Erlang, a hardware operating system ("OS") 108, a central processing unit ("CPU") 109, and telecommunications switch hardware 110.

Figure 9:
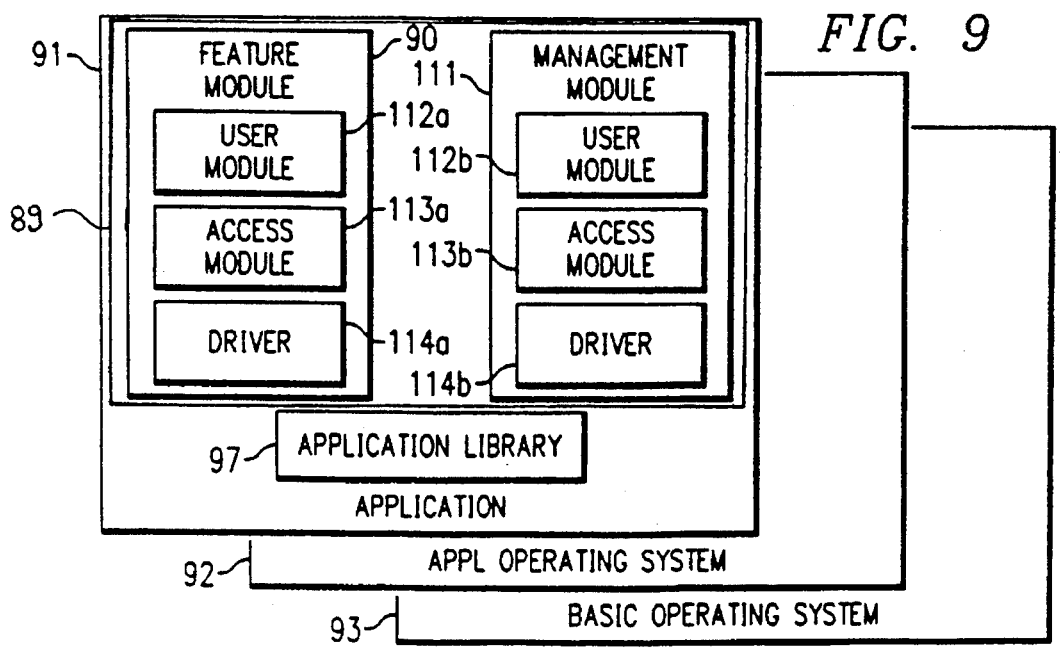
FIG. 9 is a block diagram illustrating the telecommunications software system architecture of an embodiment of the present invention.

Referring next to FIG. 9, there is shown another view of the layered software architecture of the present exemplary embodiment in which the application consists of the highest layers, i.e., those closest to the application specification. The other layers represent deeper layers of implementation which are closer to the physical machine running the software. As shown, the application consists of the application layer 91, which includes the application library 97 and the application operating system layer 92. The application layer 91 gives a view that corresponds to the way in which the application was initially specified. The application layer 91 is also isolated from the basic operating system and the system architecture by the application operating system layer 92. The application operating system layer 92 provides support functions to the application layer 91 in order to avoid reproducing code in several different tasks or features, to raise the application programming to as high a level of abstraction as possible and to isolate the application designer from implementation details. Internally, the application layer 91 is subdivided into a plurality of independent task modules 89 which can be functionally viewed as a combination of feature modules 90 and management modules 111. Each of these two types of modules, feature modules 90 and management modules 111, are very similar to one another and fully subdivided into user (call handling) modules 112a-b, access (line handling) modules 113a-b, and driver modules 114a-b. The feature modules 90 and management modules 111 together describe the complete set of features or tasks within the system. A task may comprise, for example, a telephone and management task itself, i.e., how to interact with other features, signaling protocols, etc. The "Basic Call" is considered as a mandatory feature which must always be included within the system. Task modules 89 may, for a particular task, contain only feature modules 90 or, for another task, only management modules 111. In other cases, however, a task module 89 may comprise both feature modules 90 and management modules 111.

The user module 112a of a feature module 90, for example, controls the basic call as well as any features. It controls the setting up and supervision of calls in a line protocol independent manner. By way of example, a user module 112a could contain:

(a) an initiation part which defines the initial data needed by the feature in order to perform tasks such as the creation of unique data fields, the assignment of default data to such fields and the like;

(b) a user procedure part which defines user procedure syntax and meaning and assigns default values; and (c) a traffic part which defines how the feature works.

Management modules 111 have similarly structured user modules 112b, access modules 113b and driver modules 114b.

Figure 10:
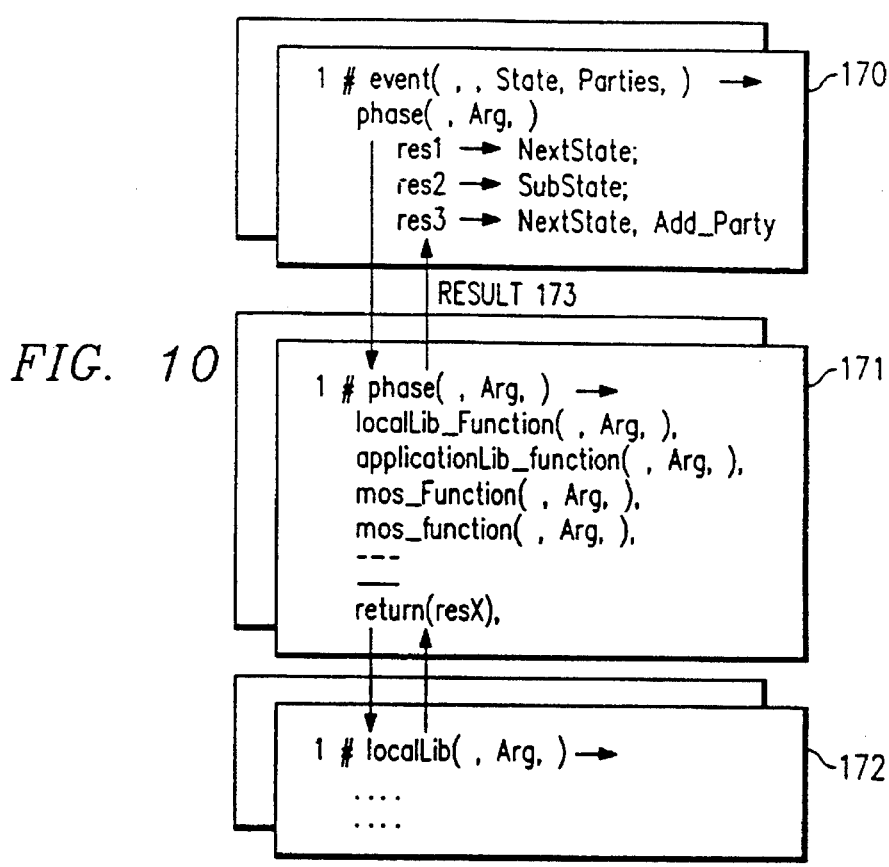
FIG. 10 is a block diagram illustrating the manner in which the traffic portion of a user module is hierarchically built in an embodiment of the present invention.

The traffic part of the feature is divided so that there is one call side (view) for each party having its own set of states separate from the other call side. This greatly reduces the total number of necessary call states with the remaining states being natural user states that can be allocated in the future. The traffic part of each user module 112a is hierarchically built from a top level. As illustrated in FIG. 10, all external and internal stimuli enter this top level in order to reach the state/event driven logic consisting of event- and substate-functions 170. It is from this top level that the appropriate phase 171 is called with the result of the phase being initiation of the next state or substate as well as the addition/removal of parties in the call. This construct provides the designer with a good overview of the entire feature just by reading this top level.

The event- and substate-functions are the only parts of the user module which are visible to the other user modules within the system. They include the possibility of interacting with a first call handling module by defining event- or substate-functions which take over control and return it thereafter. For example, logging features always return the control after the feature has completed execution. The generic support functions for state/event handling are provided by the application operating system 92.

A phase 171 is, to a large extent, a combination of function calls addressed to either its own local library 172, the application library 97 or to the application operating system 92. After completion of a phase 171, a result 173 is returned to the top level. Exemplary phase jobs include: (a) analysis of address information; (b) checks on authorities; (c) queries to other parties; (d) answers to queries by other parties; (e) switch-operations; and (f) commands to take over a line. The hierarchical structure used within the traffic portions of the application layer is illustrated in FIG. 10. There it is shown how various functions are called from various libraries and operating systems in order to implement the traffic functions.

Figure 11:
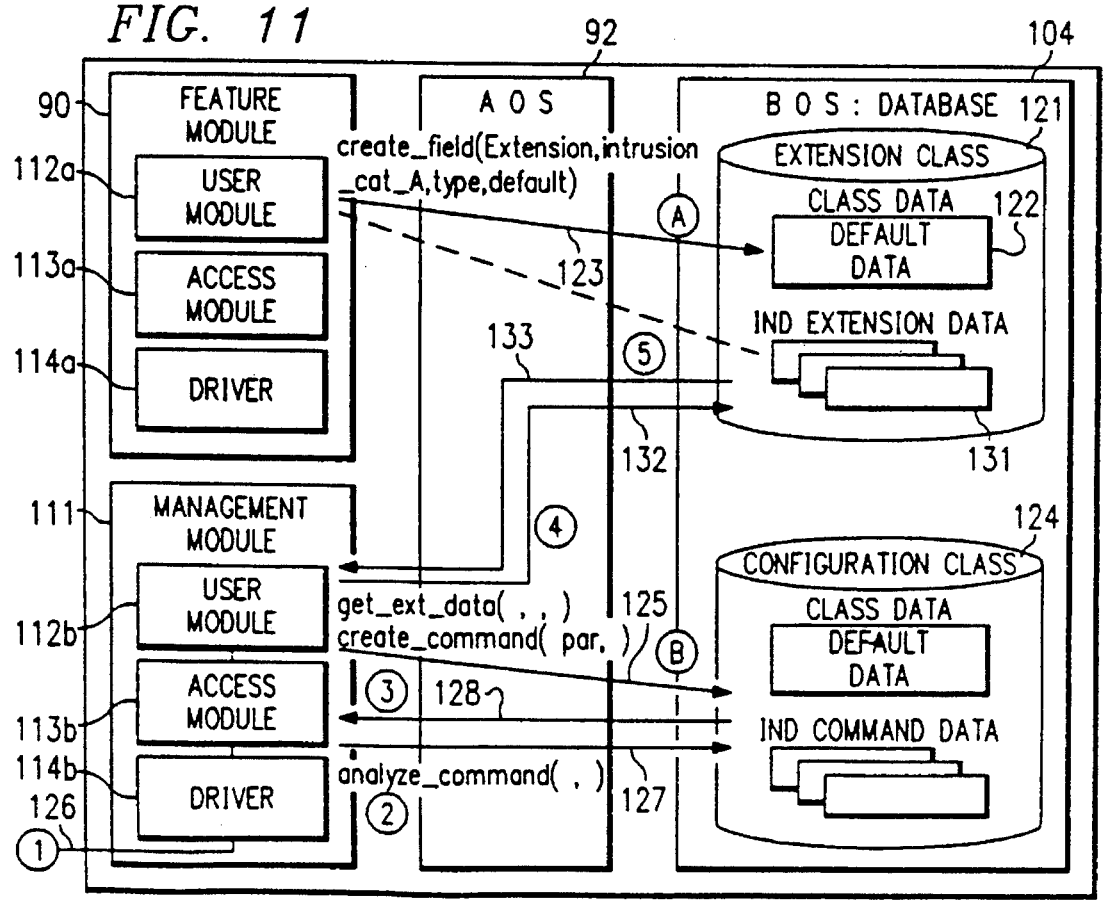
FIG. 11 is a block diagram alternatively illustrating a data handling operation within the architecture of the software system of the present invention.

The structure of the components of the system of the present invention is again expressed, in alternative form, in FIG. 11. There it is illustrated that the access modules 113a,b control the line dependent parts of features. There is a unique access module for each type of line terminal and for those features having line dependent parts. Examples of line terminals include analog/digital/ISDN telephone terminals and analog/digital/ISDN trunks for basic and supplementary services. Each access module 113 handles the semantic part of a protocol for each specific type of hardware. The access module also presents a device independent protocol directed toward the user module 112. This protocol is purely functional and independent of line terminal type. Each access module 113a,b includes:

(a) an initiation part which sets default data for the actual line, activates the hardware and resets the terminal into an appropriate state; and (b) a traffic part which caters to dispatching and handling of traffic events.

The structure of the access module 113 is slightly different from that of the user module 112. The top level of the access module 113 is divided into two smaller parts, namely, the dispatching part and the event handling part. The purpose of the dispatching part is to refine incoming events by processing/translating signals coming from the line or from the other party to an internal set of events before feeding them into an event handling part. This pre-processing is done with respect to receiving messages, message data and terminal states. The event handling part is similar to the top level in the user module. Typical phase jobs in the access module 113 include:

(a) the handling of several call access possibilities;

(b) the indication of call progress messages to the user;

(c) the handling of the semantic part of the line terminal protocol;

(d) the performance of number, procedure and suffix analysis; and (e) the creation of and cooperation with call handlers.

The driver modules 114a,b can be seen as an interface to the hardware. They handle the hardware part of the line protocol, i.e., the syntax portion of features. The driver module 114 decodes hardware line signals/bit streams and delivers them in a symbolic form to the appropriate access module 113. The driver module 114 also encodes symbolic signals from the access module 113 to hardware signals. There are also generic driver support functions for event/signal handling in the operating system which are inherited upon start-up of the module. They may be seen as the running mechanisms for signal transfer between hardware and software. There is one driver module for each type of terminal/hardware.

Included within this system embodiment are a number of management modules 111 that accommodate an array of different types of management functions, including: (a) fault management; (b) configuration management; (c) accounting management; (d) performance management; and (e) security management, among others.

Management features are handled by management modules 111 in a manner similar to the way that feature modules 90 define and implement telephone features. A management module may handle a single type of or more than one management function. Management modules 111 are composed of management user modules 112b, management access modules 113b, and management driver modules 114b, respectively, as illustrated in FIGS. 9 and 11. Similar to the manner in which the feature module 90 operates, the management driver module 114b handles the syntactic part of the management protocol and the management access module 113b is responsible for the semantic part of the management protocol. Finally, the management modules 111 interact with the feature modules 90 as follows:

(a) via the database for configuration commands;

(b) as reports/message receivers for logging features; and (c) via the database and directly with the hardware for line management.

Referring again to FIG. 11, the block diagram illustrates not only the configuration of the various components of the software architecture, as also illustrated in FIG. 8, but it also indicates the interaction between and among each of the components. The feature module 90 creates feature unique data fields 121 in the appropriate BOS database 104 and assigns formats and limits default data values 122 during its initiation part, as illustrated at 122 and at 123. The management module 111 creates its initiation part commands and parameters by referring to class data fields 124 as illustrated at 125. These are stored in the configuration database 104 together with the retrieving class data field 124 limits and access authorities. Upon reception of a command at 128 into the driver 114b of a management module 111, the command is analyzed by a command analyzer at 127 and the authority to use the command is checked. Further, at 127 and 128 it is determined whether the given parameters are within the value limits stored in the class data field 124. When the command is accepted, the appropriate individual will be allowed access by the actual management feature and the appropriate feature—unique data field 131 may be operated upon and received by the user module 112b as illustrated at 132 and 133. Such operations may include insertion, change, print and remove operations.

More particularly, the initiating part within the user module 112a of the feature module 90 will, when initiated, call a procedure "create_field" within the AOS layer 92. This procedure initiates the default data in the BOS database 104 of extension class data 121 to be used for the attribute (or parameter) "intrusion_cat_A" (i.e. the calls of service, or category, of the originating party, the A-party, to initiate intrusion). The assigned format or limits for this data is also stored in the database 104.

When executing the traffic part within the user module 112a of the feature module 90 and when testing the intrusion_cat_A, a procedure check within the AOS layer 92 is called. This procedure first checks whether the concerned user has an individual category for "intrusion_cat_A" programmed in the individual extension database 131. If so, this category will be used. Otherwise, the default data specified in 122 of the extension class database 121 will be used.

The initiating part within the user module 112b of the management module 111 will, when initiated, by use of an AOS layer 92 procedure, create references 125 in the configuration class data 124 for each attribute or parameter defined in the extension class default data 122.

When a management operation is received within the access module 113b of the management module 111 then the actual operation is validated, along with the management user's authority to use the operation. Once the management operation is found to be valid it is then passed to the user module 112b. If the management operation was to create a data field for "intrusion_cat_A" for extension "12345" with the value "yes" then the following takes place: the user module 112b will, by use of an AOS layer 92 procedure, call the default data 122 within the extension class 121 to get the actual format of the data field "intrusion_cat_A" parameter. If the value "yes" is valid within this format then a procedure within the AOS layer 92 is called to update the individual extension data 131 for extension "12345" with value "yes". If the management operation was to get data field "intrusion_cat_A" for extension "12345" then an AOS layer procedure is called which fetches 133 the actual value in the individual extension data 131.

A management feature can also receive an output from a feature logging data, for example. The management feature then subscribes to certain events and selected telephone features and, when these events occur, the telephone features will dump standard messages to the appropriate management feature. Commands are then handled by this management module 111 which in turn decides:

(a) whether or not received data should be thrown away;

(b) when output should occur;

(c) which data is to be output;

(d) the format for the output data; and (e) the address to which the output data should be sent.

Management modules 111 may be reached either from local terminals or from a network management center.

Application data are divided into two types, static data and dynamic data. All data are physically stored within databases which are managed by the basic operating system 93 and each of the views of the data described above are seen from the application layer 91. Static data are data which live longer than one call. The lifetime of static data can be short, e.g., one day, the lifetime of the data depends upon which feature owns the data and most such data will not normally survive a system breakdown or longer, in which case the data lives until it is changed by command or restored from backup media after system breakdown. Examples of short lifetime data include call back information or follow me data while examples of long lifetime data are number series, allowed feature accesses for users (class of service), user activated features, feature related data, etc.

The data of a certain type belong either to a class of objects or to a super class in which a class can be seen as a certain user type. This data type has a name, a default value, a specified format, an allowed value interval, and information about whether or not it should be restored after system breakdown. Individuals are associated with a class when created; upon instantiation of the individual entities, they inherit the appropriate class data. The default data value may then be changed for each of the individuals. Typical class data include: extension class data 121, configuration class data 124, operator class data, destination class data, route class data and trunk class data. To find classes and class individuals, analysis tables are included in the present system. These are data tables derived or changed upon creation of or change of classes and/or class individuals.

Dynamic data are data, associated with calls, which die when the call has ended. Typical dynamic data includes references between parties in the call, call history (i.e. executing features, earlier connections, etc.) and call states. Dynamic data can only be manipulated by the object/process itself and access is achieved via the data name. For static data, in contrast, access is obtained by owner reference in combination with data name.

The application operating system layer 92, a level below the application layer containing the feature module 90 and the management modules 111, is also depicted in FIG. 11. The intention with the application operating system layer 92 is to isolate implementation details from the application layer, thereby raising the abstraction level associated with application design. The interface to the operating system is general and implies that the application operating system layer 92 remains unaffected with respect to internal changes and operating system functions contained in system hardware. The application operating system layer 92, as illustrated in FIG. 8, includes two main function groups comprising a tool kit 98 and generic functions 99. The application operating system tool kit 98 provides general purpose functions to the application layer 91. Typical functions which may be included in the application operating system tool kit 98 include: (a) inter party communication; (b) party handling; (c) switch operations; (d) queue handling; (e) timing; (f) history handling; (g) data field handling; (h) number handling; (i) procedure handling; and (j) administration handling.

Referring further to FIG. 8, the application operating system 92 generic functions 99 provides support functions for event/substate handling and for entering new states. The generic functions 99 can be seen as the engine for the application layer. When an event or substate occurs, the support functions provided by the generic functions 99 try to match this event or substate, including its parameters, to the user modules 112 (or the access modules 113) of the system in a fixed order. If the event or substate concerns a user, matching is tried upon the user modules 112 according to a feature list. If the event concerns access, matching is tried upon the access modules 113 according to an access feature list. When a user module 112 or an access module 113 with a matching event is found, this module is called and the corresponding function is executed. If an event or substate concerning a user does not have a matching event or substate, the call will be aborted. If an event concerning access does not have a matching event then the event will be ignored.

The application operating system 92 also contains built-in functions for entering new states which can either be directed to the user module or the access module. The "new state" may include:

(a) a new state;

(b) a substate before entering a given new state;

(c) a new state in combination with adding or removing parties;

(d) current state; or (e) abort the call/no state.

In defining the call model, the process concept has been chosen to model the run time structure of the application. The term process, as used in this context, means the sequential execution of statements with an associated set of data. Processes may be executed concurrently, and a process becomes active, i.e. under execution, due to an external stimuli/signal. A process is always in a certain defined state when execution is completed. All of these characteristics of the process concept match very well the characteristics of the telecommunications applications, i.e., many parallel calls, each of which consists of one or several sequences of operations. The process concept is supported by both the extended operating system and the specially created programming language of the present invention, as described above.

In the present exemplary system, the extent of processes is delimited in the same way as the application code is delimited in order to have as complete a match as possible between the application structure and the run time structure. As shown in FIG. 12, the application code has been modularized as close as possible to the functional specification objects. This construct leads to the assumption of one process for each hardware device in a driver process, each type of line in an access process and each party in a user process.

Because networking features and stand-alone telecommunications switching features should be well matched, the present system uses a split view for implementing call control. This means that there are two call sides, each one having its own set of processes. The main advantages of split call control include the following:

(a) The total number of states are significantly reduced. The state concept is used to reduce complexity of the application code and is, as such, a highly desired concept. In centralized call models, the number of states tends to grow out of control as states have to be applied to combined configurations with several parties.

(b) The parties are well isolated from each other, each having its own state and history. When a call returns to an original call configuration, normally a two party call, the data for each call side is still valid. Split call control requires in many cases negotiation and communication between call sides before decisions can be made. The communications between the sides is supported by a high level protocol providing for message passing between processes. At least three different communication situations can be supported:

(a) Message sending with no acknowledgement;

(b) Message sending with acknowledgement; and (c) Message sending with request for further information and with acknowledgement.

For each of these types of communications there may be four message types:

(a) A notify message which is used to send messages when no acknowledgement message is expected;

(b) A request message which is used to send messages when an acknowledgement message is expected;

(c) A verify message which is used to request further information before giving a reply message; and (d) A reply message which is the acknowledgement message to a previous request message.

FIG. 12 illustrates what has been discussed above within the context of a particular implementation for a prototype PBX switching system. FIG. 12 illustrates the protocols that must be implemented and utilized in order to effect the communications between call sides that is necessitated by the split call control paradigm. The communication between sides is supported, first, by a high level protocol 180 for message passing from user to user. Other lower-level protocols support the completion of communications down to the hardware level and back up the chain. The user/access protocol 181 provides for communications between a user process 165 and an access process 164. The access/driver protocol 182 provides for communications between the access process 164 and a driver process 163. Finally, the hardware driver protocol 183 provides for communications between a driver process 163 and individual hardware units 184.

Figure 13:
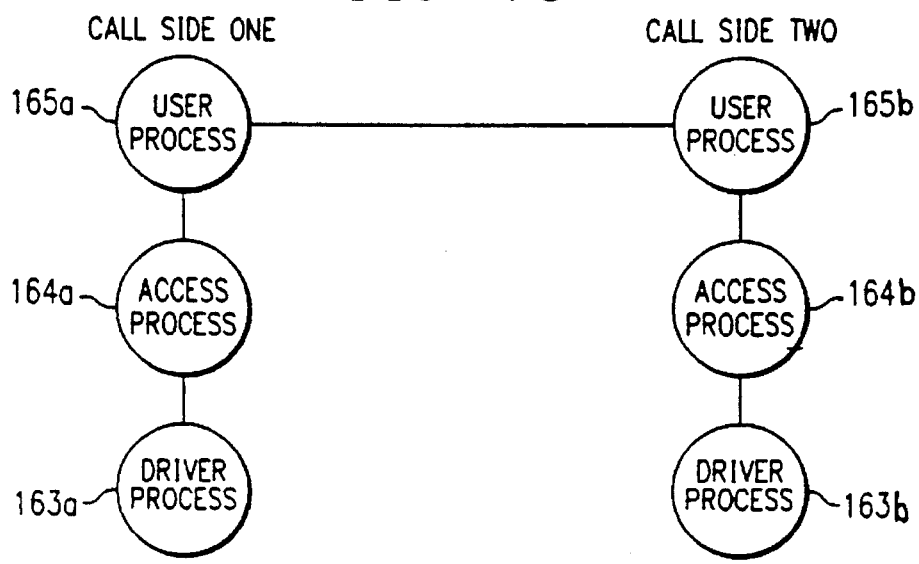
FIG. 13 is a diagram illustrating the interaction of the call sides in an embodiment of the present system.

FIG. 13 illustrates a call model example for a basic call, showing user processes 165a,b, access processes 164a,b, and driver processes 163a,b, one for each of the two separate call sides of the basic call illustrated. The hardware detects when the call is initiated and sends a signal bit stream to its driver process. The driver 163 then converts the signal bit stream into symbolic form and sends a message to its own access process 164, which waits for, receives, analyzes and converts address information for the called party into the logical individual reference for the called party. When this work is complete, the access process 164 initiates a user process 165 for its own call side and sends a set-up message to it. The user process 165 allocates the logical individual reference for the called party. Then, it initiates a user process 165b for the same called party and asks its user process 165a to set up the call. The user process 165b for the called party asks the access process 164b for this party to seize the party and to link itself to this user process 165b. Then, an acknowledgement message is sent back to the originating side's user process 165a and the complete call model for the basic call is then set up.

Figure 14:
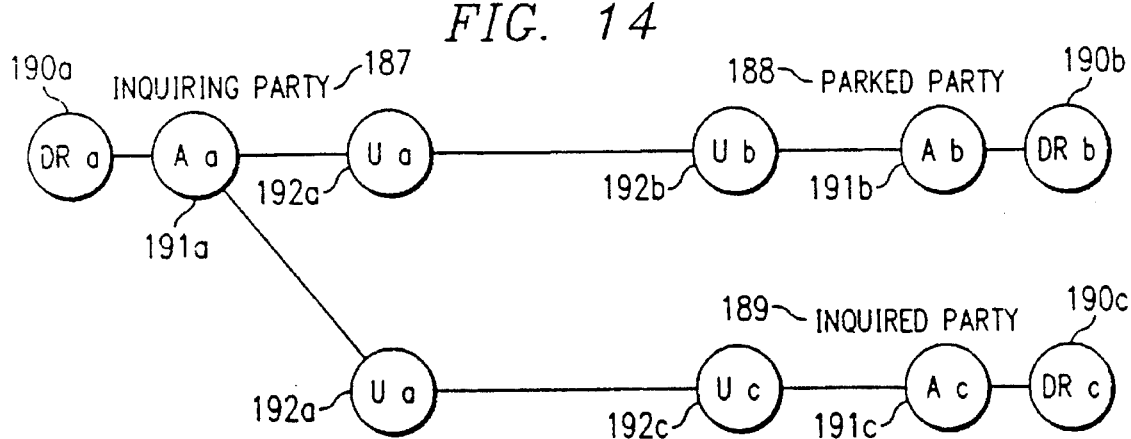
FIGS. 14–16 are diagrams illustrating various aspects of the implementation of functional features within an embodiment of the present system.

Referring next to FIG. 14, there is shown an illustration depicting the call model for calls including three parties. For an inquiry call 187 or when an operator sets up a second call side, the access process 191a parks the first call 188 and sets up an identical series of processes (user 192a—user 192c—access 191c—driver 190c) for this new call 189. The access process 191a is thus linked to two series of processes 188, 189, one for each call.

Figure 15:
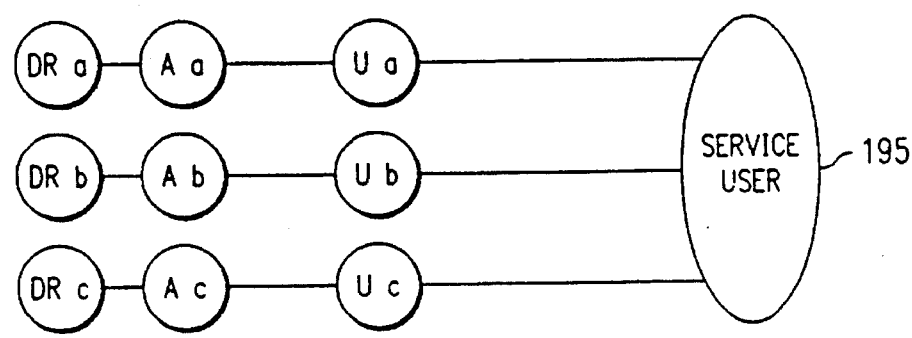

Referring next to FIG. 15, there is shown an illustration of a call model for a multi-party call. In multi-party calls, an ordinary call side chain of processes is used for each participant. On the opposite call side there is one common ordinary service user process 195. It has no linked access processes, so this configuration makes it look like a set of ordinary two-party calls from each participant's call side.

Figure 16:
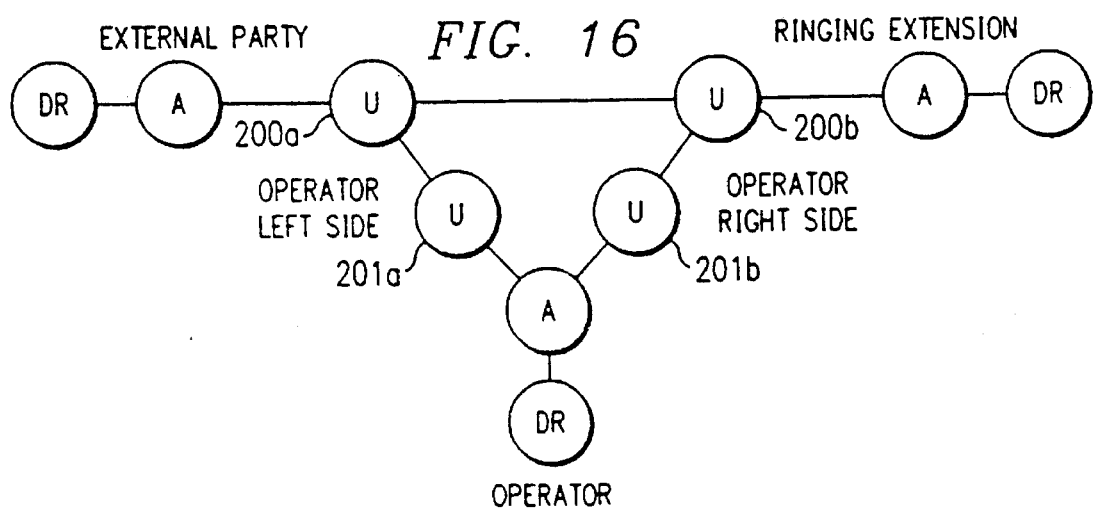

Referring next to FIG. 16, there is shown an illustration of a call model for a recall to the operator. At recall to the operator there is a new call side linked in from each user 200a,b of the original call to one operator user 201a,b on each call side. When designing features, the call model must be kept in mind and the philosophy and examples set forth above in connection with FIG. 13–16 can be seen as guidelines in making the call model for future scenarios. Ideally, one should strive for a model that matches the application concept well and which is easily adaptable to probable new states in the application picture.

The programming language used in the system of the present invention is an extended declarative language capable of implementing parallelism along with real time facilities. The language ERLANG includes these necessary characteristics, some of which, for example, are as follows:

(a) high level data structures like lists and tuples from LISP or PROLOG supported by dynamic memory management;

(b) high level symbolic programming giving the same type of efficient program development such as LISP;

(c) execution through pattern matching and simple control structures giving a short and clear style of programming;

(d) modules, employed as an aid for structuring large program systems;

(e) processes, process management and communications supporting concurrency and real time operations;

(f) support for error detection and error correction that enables the design of robust systems, for instance with per-call error recovery; and (g) close approximation to SDL, the specification language recommended by C.C.I.T.T.

By way of illustration, set forth below are some code examples taken from the Basic Call implementation. The following is an example from the events/state level in which a set-up message including five parameters has been received. Matching of the event has been implemented for feature modules according to the feature list. Other features have had the chance to interact with the event, but none did. A last matching is tried with the Basic Call module as set forth below:

```
1 #   setup( Self,_,Idle,[Self],[CallType.no_name] ) —>
        case
        call_start_up( Self,CallType ) {
          barred —> abort( blocked );
          ok —> state( call_started );
          complete( Partner) —> state(call_started,add( Partner ));
        }.
2 #   setup( Self,_,Idle,[Self],[CallType,Name] ) —>
        case
        establish_call( Self,CallType,Name ) {
          barred —> abort( blocked );
          yes(Partner)—>state(call_started,seizure,add(Partner));
        }.
99 #  setup(_,_,_,_,_) —>
        continue.
```

© 1991 Telefonaktiebolaget L M Ericsson

Pattern matching occurs in which matching with the received set-up message is first tried including all of the parameters simultaneously on the first Basic Call set-up clause. If there is a match, this function definition will be applied. If the function does not match, matching is tried on the next clause, and so on. If there is no match on the parameters the control is given back to the engine. Because the Basic Call is the last feature in the feature list, the call would in this case be aborted. Examples of high level symbolic programming can be visualized by the function called names and of the parameter names in the set-up clauses. Suitable names of any length may be chosen by the software designer.

High level data structures are included with the parameter [CallType, No_Name] of the set-up clause that is a list that represents a data structure with two variables. There are, in the present system, simple call control structures in which there are actually very few such control structures at all. In the example above there are only two control structures, namely case and continue. The case statement is, however, the most important control structure statement. Set forth below is an example from the phase level in which we assume the first set-up clause in the example above has matched the received message. The function call in this clause, call_start_up (Self, CallType), is called.

```
1 #    call_start_up( Self,CallType ) —>
          case
            check( call_allowed,Self ) {
              no —> notify( release(barred),Self),
                   ^barred;
              yes —> remember( call_direction,caller_A ),
                     notify( setup_ack(normal),Self ),
                     ^ok
            }.
```

© 1991 Telefonaktiebolaget L M Ericsson

When the call_start_up clause in its turn is matched, the first function call is the AOS function check/2, which has two parameters. This function is evaluated and the result is returned to the call_start_up function, which does its job by calling a couple of other AOS functions and then returning the result to the calling setup function.

Figure 17:
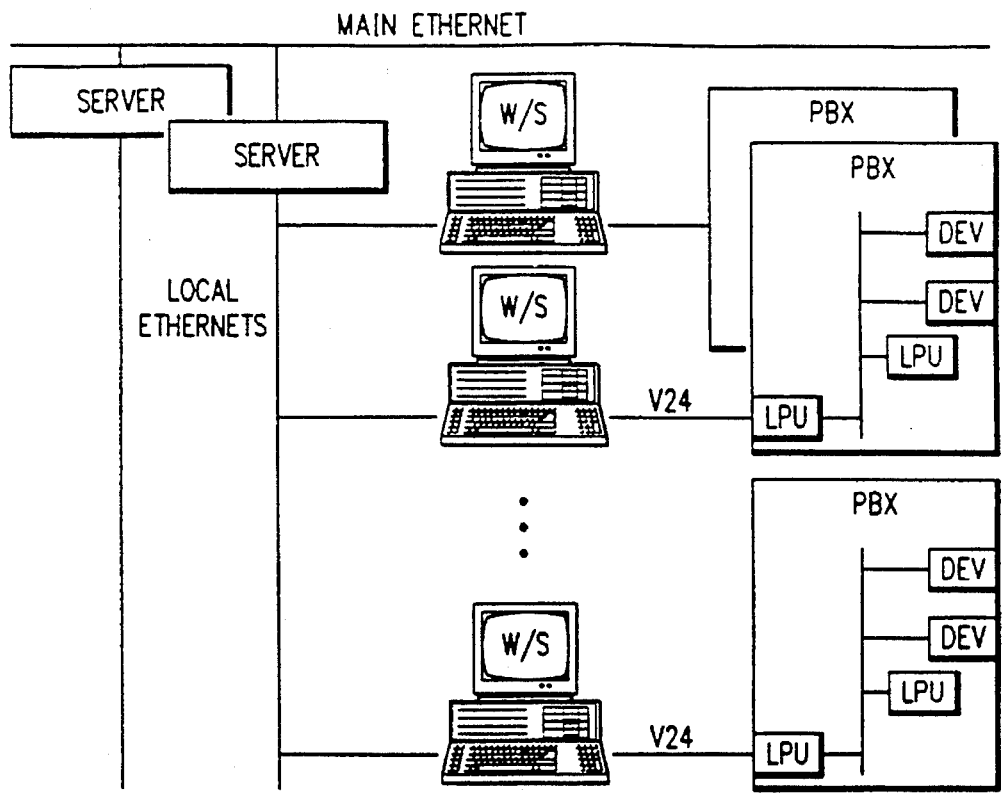
FIG. 17 is a block diagram showing an overall development environment within an embodiment of which the present system for prototyping may function.

One problem inherent in the development of imbedded real-time systems, to which telecommunications systems belong, is that there are always two computers involved. There is a host computer, usually a VAX, IBM or other comparable computer, on which the program development takes place and a target computer such as the APN or APZ specialized Processors used in the Ericsson AXE SPC telecommunications switching system, on which the programs execute in the operational system. This necessarily means that there will be a large turn around time between developing and editing programs on the host computer and testing them in the target machine. In the system of the present exemplary embodiment, however, these activities are combined. Through some manipulations a line interface module ("LIM") is controlled by a work station and its computer and, thus, combines the functions of the host and target computer so that the edit-execute cycle time is thereby virtually eliminated. As illustrated in FIG. 17, such a design/execution configuration includes numerous advantages.

Figure 18:
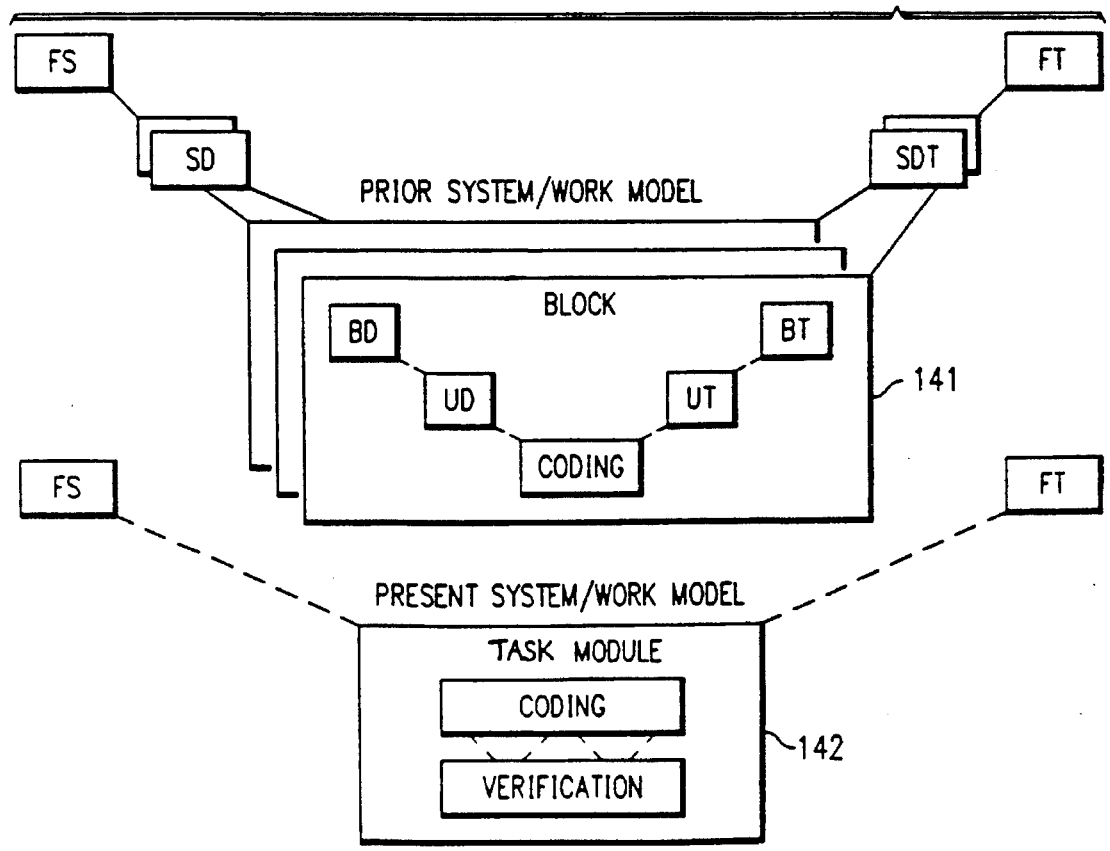
FIG. 18 is a block diagram illustrating certain differences between the system of the present invention and certain other known systems.

As illustrated in FIG. 18, one known work model includes a substantially greater number of steps compared to the system of the present invention. There can be seen how the features are housed in a large number of blocks 141 in comparison to the simple symbol task module 142 of the present invention. Thus, there is a great simplification of the steps of specification and coding that lead to a final operational software system.

Higher software quality is yet another advantage that stems from the present system. A number of aspects of the present system have been implemented and tested to determine their design efficiency over an earlier, known telecommunications system. The results of the design efficiency tests are that the present system performs better than the known system for every tested feature. Further, on average, the time required using the present system to design, implement, verify and document a feature is much less than the time required under the known system.

These efficiency factors, coupled with the fact that a designer need not, in the present exemplary system, wait for another designer's work before verifying his own code, means that software development can occur in a planned and properly ordered sequence. The present exemplary system produces software with a clear hierarchy comprising individual, already verified building blocks that makes it easy to see and understand the whole system readily. Further, the present system allows code to be verified independently and incrementally, and it provides tools for error recovery and for code analysis. As briefly mentioned above, the number of persons involved for both design and verification of the feature can be reduced to a single individual thereby reducing waiting time and lead time. The present system also enables planning and design verification to be done even before functional testing.

The main factors that make it interesting and yet easy to design feature modules employing the system of the present invention include the fact that the verbal text of the functional specification corresponds to the code in the feature module, thus improving both code and feature understanding. Further, programs can be made small and surveyable by using language qualities like matching, list handling and recursive functions. The design is generated incrementally and interactively and allows structured growth. Therefore, patching is not needed or even possible as programs can be recompiled on the fly. Repeated verification of a feature or of parts thereof is automatic, i.e. merely by test file activation and data can be displayed at a high symbolic level. In addition, it is not necessary to consider capacity problems during design, there are many fewer documents to write, and the designer can verify the entire feature before it is released for real use. The quality of software is greatly enhanced, which in turn produces greater satisfaction for the designers.

Most of the efficiency factors mentioned above are also valid when adding new functionality to a system. The addition of functionality is equivalent to adding a new feature module to the system. This feature module either contains completely new functionality that is added to the Basic Call module or a replacement of already existing functionality on the feature module over the Basic Call module.

Many of the efficiency factors mentioned above are also valid when designing a feature in a distributed design environment. The most important of these includes the fact that development is divided into small and complete feature modules. The designer becomes independent of other designers when creating his feature. In addition, narrow interfaces make the need for coordination very small. The only necessary input to the feature designer is the function specification, the actual version of the system library and of the application operating system tool kit. Finally, interaction between features, i.e., the order in which features are called, is solved by operational procedures and the interactions may be tested in one single location.

As can be seen from examining the various aspects of the system of the present invention, there are numerous advantages inherent in both the software language structure which enables the implementation of software prototypes as well as basic software architectures for implementing telecommunications switching systems. Further, it can be readily seen that the system can be easily adapted to other process control system applications.

It is thus believed that the operation and construction of the present exemplary invention will be apparent from the foregoing description. While the method, apparatus and system shown and described has been characterized as being preferred, it will be readily apparent that various changes and modifications can be made therein without departing from the spirit and scope of the invention as defined in the following claims.

What is claimed is:

1. A computer system containing executable program code developed with a declarative programming language, said computer system operating to provide telecommunications services, said system comprising:
  a plurality of telecommunications hardware devices with device parameters and specifications for processing telecommunications data within said computer system;
  a plurality of objects, each object including a sequence of executable instructions with necessary device parameters and specifications for controlling one of said hardware devices;
  a plurality of device independent predicates, each predicate including a sequence of executable instructions with object parameters and specifications for invoking one or more of said objects to control the execution of a specific telecommunications function through one or more of said plurality of hardware devices; and
  one or more device-and-object independent subjects, each subject including a sequence of executable instructions each invoking one or more predicates to, in turn, invoke one or more objects to control the execution of a specific telecommunications service through associated hardware devices and allowing each subject to control telecommunication service execution without specifying object parameters or specifications for any invoked objects or any device parameters or specifications for the associated hardware devices.

2. The system as set forth in claim 1 wherein said declarative programming language is Erlang.

3. The system as set forth in claim 2 wherein each of said sequence of executable instructions within each of said objects is an Erlang statement.

4. The system as set forth in claim 2 wherein each of said sequence of executable instructions within each of said predicates is an Erlang statement.

5. The system as set forth in claim 2 wherein each of said sequence of executable instructions within each of said subjects is an Erlang statement.

6. The system as set forth in claim 1 wherein one of said hardware devices is a telephone trunk.

7. The system as set forth in claim 2 wherein one or more of said hardware devices is represented by a data structure comprising an Erlang object.

8. The system as set forth in claim 1 wherein at least one said specific telecommunication functions executed by one or more objects invoked by a predicate is subscriber number analysis.

9. The system as set forth in claim 1 wherein at least one of said telecommunication services includes subscriber call forwarding.

10. The system as set forth in claim 2 wherein one or more of said subjects comprise an Erlang module.

11. The system as set forth in claim 2 further comprises data and real world entities wherein said data and real world entities are represented by Erlang objects.

12. The system as set forth in claim 1 wherein one or more of said predicates are software functions or procedures.

13. The system as set forth in claim 1 wherein one of said subjects is the main software body of said executable code.

14. A computer program product comprising:
  a computer usable storage medium having computer readable program code embodied in said medium for causing the assembly of sets of executable computer instructions coded in a declarative programming language, and which instructions form part of a process control system to provide telecommunications services, said computer program product having:
  means for organizing sets of executable computer instructions into objects that are specifically defined for communication with telecommunications hardware devices, wherein said executable computer instructions within each object contain specific parameters and specifications needed to control a specific telecommunication hardware device;
  means for organizing sets of executable computer instructions into device independent predicates for invoking selected ones of said objects and performing a specific telecommunications function; and
  means for organizing sets of executable computer instructions into device-and-object-independent subjects invoking selected ones of said predicates and, in turn, calling one or more objects and performing the execution of said telecommunication services.

15. Said computer program product for causing the assembly of sets of executable computer instructions as set forth in claim 14 wherein said declarative programming language is Erlang.

16. Said computer program product for causing the assembly of sets of executable computer instructions as set forth in claim 15 wherein each if said executable computer instructions is an Erlang statement.

17. Said computer program product for causing the assembly of sets of executable computer instructions as set forth in claim 14 wherein one of said telecommunications hardware devices is a telephone trunk.

18. Said computer program product for causing the assembly of sets of executable computer instructions as set forth in claim 15 wherein one or more of said telecommunications hardware devices are represented by a data structure comprising an Erlang object.

19. Said computer program product for causing the assembly of sets of executable computer instructions as set forth in claim 14 wherein said specific telecommunication function is subscriber number analysis.

20. Said computer program product for causing the assembly of sets of executable computer instructions as set forth in claim 14 wherein one of said telecommunication services is a special subscriber service feature.

21. Said computer program product for causing the assembly of sets of executable computer instructions as set forth in claim 15 wherein one of said subjects comprises an Erlang module.

22. Said computer program product for causing the assembly of sets of executable computer instructions as set forth in claim 15 wherein data and real world entities within said control system are represented by Erlang objects.

23. Said computer program product for causing the assembly of sets of executable computer instructions as set forth in claim 14 wherein one or more of said predicates are software functions or procedures.

24. Said computer program product for causing the assembly of sets of executable computer instructions as set forth in claim 14 wherein one of said subjects is the main software body of said control system.

* * * * *